US012751462B2

(12) United States Patent
Martinez-Barbreau

(10) Patent No.: US 12,751,462 B2
(45) Date of Patent: Oct. 6, 2026

(54) BIOSTIMULANT AND METHOD FOR STIMULATING PLANT RESISTANCE TO WATER STRESS

(71) Applicant: Christelle Martinez-Barbreau, Cazevieille (FR)

(72) Inventor: Christelle Martinez-Barbreau, Cazevieille (FR)

(73) Assignee: ELICIR, Montpellier (FR)

( * ) Notice: Subject to any disclaimer, the term of this patent is extended or adjusted under 35 U.S.C. 154(b) by 209 days.

(21) Appl. No.: 18/494,842

(22) Filed: Oct. 26, 2023

(65) Prior Publication Data

US 2024/0049728 A1 Feb. 15, 2024

Related U.S. Application Data

(63) Continuation-in-part of application No. 15/505,605, filed as application No. PCT/FR2014/052123 on Aug. 25, 2014, now Pat. No. 11,800,873.

(51) Int. Cl.
*A01N 65/08* (2009.01)
*A01P 21/00* (2006.01)

(52) U.S. Cl.
CPC .............. *A01N 65/08* (2013.01); *A01P 21/00* (2021.08)

(58) Field of Classification Search
None
See application file for complete search history.

(56) References Cited

U.S. PATENT DOCUMENTS 11,800,873 B2 * 10/2023 Martinez-Barbreau ...................... C05F 11/00
2008/0182751 A1 * 7/2008 Morra .................... A01N 65/08 424/754

OTHER PUBLICATIONS

Lord et al. J. Agric. Food Chem. vol. 59, 7882-7890. (Year: 2011).*
Messiha et al. World Applied Sciences Journal vol. 26, No. 9, pp. 1142-1149. (Year: 2013).*

* cited by examiner

*Primary Examiner* — Katherine Peebles
(74) *Attorney, Agent, or Firm* — Patshegen IP; Moshe Pinchas

(57) ABSTRACT

The invention relates to the use of a crushed material obtained from at least one part of *Rocket* plants, for example of the genera *Eruca* (*Eruca sativa, Eruca vesicaria*, etc.), *Diplotaxis* (*Diplotaxis erucoides, Diplotaxis tenuifolia, Diplotaxis muralis*, etc.), *Bunias* (*Bunias erucago, Bunias orientalis*, etc.), *Erucastrum* (*Erucastrum nasturtiifolium, Erucastrum incanum,* etc.) or *Cakile*, in order to stimulate plant growth or root growth.
The usefulness of the product of the invention has also been proven in conditions of stress for the plant (for example water stress).
The crushed material is obtained from leaves, seeds and/or flowers of plants.

15 Claims, 25 Drawing Sheets

| | DM4J | DM11J | DM34J |
|---|---|---|---|
| Mean size of the aboveground portion (cm) | C=31.42<br>b<br>A=37.14<br>a | C=57.14<br>b<br>A=64.28<br>a | C=110<br>b<br>A=119.14<br>a |
| Mean rate of growth (cm/d$^{-1}$) | C=1.32 b<br>b<br>A=2.32<br>a | C=2.64 b<br>b<br>A=3.08<br>a | C=2.4 b<br>b<br>A=2.6<br>a |
| Mean diameter of the stem (cm) | -<br>- | C=5.41<br>b<br>T=6<br>a | C=5.5<br>b<br>T=6.25<br>a |
| Aboveground portion weight (g) | -<br>- | -<br>- | C= 30<br>b<br>A= 35.5<br>a |

Figure 21

| | DM4J | DM8J | DM15J |
|---|---|---|---|
| Chlorophyll index<br><br>Dualex unit | C=26.87<br><br>b | C=30.62<br><br>b | C=34.37<br><br>b |
| | C=28.12<br><br>a,b | C=33.12<br><br>a,b | C=37.87<br><br>a |
| | P=29.37<br><br>a | P=33.75<br><br>a | P=35<br><br>b |
| Flavonol index<br><br>Dualex unit | C=0.64<br><br>b | C=0.77<br><br>b | C=0.71<br><br>b |
| | A=0.83<br><br>a,b | A=0.81<br><br>a,b | A=0.78<br><br>a,b |
| | P=0.93<br><br>a | P=0.91<br><br>a | P=0.88<br><br>a |

Figure 22

BIOSTIMULANT AND METHOD FOR STIMULATING PLANT RESISTANCE TO WATER STRESS

TECHNICAL FIELD OF THE INVENTION

The present invention concerns a biostimulant, a use of crushed material obtained from *Rocket* plant, for example of the genera *Eruca* (*Eruca sativa, Eruca vesicaria*, etc), *Diplotaxis* (*Diplotaxis erucoides, Diplotaxis tenuifolia, Diplotaxis muralis*, etc), *Bunias* (*Bunias erucago, Bunias orientalis,* etc), *Erucastrum* (*Erucastrum nasturtiifolium, Erucastrum incanum,* etc) or *Cakile* (*Cakile maritima*, etc), in order to promote plant growth or root growth, and a method for speeding up the growth of a plant.

The present invention applies, in particular, to promoting plant growth (increasing the biomass of plants in general, and/or increasing the size of plants, and/or increasing the size of the fruit, and/or increasing the weight of the fruit), as well as the precocity of plant growth (earlier flowering, and/or appearance of fruit, and/or physiological stages in general). The present invention applies to agriculture in general, gardening, horticulture, arboriculture, etc.

The usefulness of the product of the invention has also been proven in conditions of stress for the plant (for example water stress).

The invention particularly relates to the field of cultivated plants, in particular in fields, and to the prevention of the harmful effects linked to exposure to water stress in said cultivated plants, in particular the loss of dry matter, i.e., per hectare, and the decrease in yield. Thus, the invention also relates to a biostimulant and a method of preventive or curative treatment of a plant in cultivation to limit the loss of dry matter linked to water stress.

STATE OF THE ART

Since the end of the Second World War, the global pesticide industry has been one of the main factors in the rising productivity of agriculture throughout the world.

Since the early 1990s, the intensive use of chemical products in agriculture has been increasingly called into question by both the public and scientific communities. Serious concerns have therefore arisen about the long-term effects of the products used on the environment: effects on animal species other than those targeted, on aquatic systems, as well as about the amount of residue in the treated products (fruit, vegetables) to which consumers will be exposed.

There is also the problem of the direct exposure of users (farmers), who will be in direct contact for years with the agricultural products, whose long-term toxic effects are not always known.

Therefore, there is a growing consumer demand in developed markets for food known as “organic”.

Parallel to this growing awareness and this change in some agricultural practices, ministries in various European countries, and even worldwide, are undertaking serious steps to “reduce chemical inputs”, with a vast campaign to inform and raise awareness about the need to stop inappropriate use of chemicals.

At the same time, some chemical products are being “removed from the market” by European authorities, because of their recognized toxicity. It should be noted that the molecules removed are not always replaced by another one, leaving some phytosanitary problems with no solution.

A very serious problem concerns the entire family of fertilizing products, fertilizers, also used abusively to achieve ever-higher levels of production. The use of fertilizers therefore brings two types of consequences that can entail health risks (affecting human health) or environmental risks (damage to ecosystems). The best-known health risk relates to the consumption of water high in nitrate (nitrogen fertilization) by infants.

The environmental risk cited most is pollution of the drinking water, or eutrophication of water, when too much organic or mineral fertilizer is applied compared to the plants’ needs and the soil’s retention capacity, and the soluble elements enter the groundwater through infiltration or watercourses through run-off.

More generally, the consequences of intensive use of fertilizers, which can entail risks and which are being critically examined, are as follows: effects on the quality of soils, their fertility, their structure, the humus and the biological activity; effects on erosion; effects linked to the nitrogen cycle and the toxicity of the nitrates; effects linked to the phosphorous cycle; effects linked to the presence of heavy metals (cadmium, arsenic, fluorine); eutrophication of fresh water and seawater; pollution emitted by the fertilizer industry; etc.

Biostimulants are among a range of new emerging products whose benefit is to boost sustainable, safe agriculture. This new family of products should allow the use of conventional fertilizers and inputs, and therefore the environmental impact of agricultural treatments, to be reduced.

In order to replace the intensive use of polluting fertilizers, a Biostimulant applied on the plant or in the rhizosphere must have a positive effect on a plant’s growth, enabling better assimilation of nutrients (for example, by acting on the development of the root system) thereby boosting the effectiveness of the nutrition, better resistance to abiotic stresses, or improved quality of the crop, independent of a fertilizing function. The plant’s metabolism must be stimulated so that it can optimize the use of the available resources, rather than providing it with an intensive application of fertilizers.

Plants, that is to say crops, trees and ornamental plants or trees, are subjected to various stresses. In particular, plants are constantly exposed to their environment and cannot escape water stressors (drought, heat, salinity, etc.). These water stresses cause morphological, physiological, biochemical and molecular changes in plants, resulting in a reduction in the yield per hectare of crops, i.e., a reduction in the production of dried material. In other words, a plant cultivated, for example in fields, is subjected to these various stresses having in particular the effect of a decrease in the production of dry matter by the plant compared to a plant cultivated under optimal conditions (controlled conditions of water intake, day/night period, no exposure to water stress). To fight against water stress (or drought), farmers use extensive irrigation of crops, which creates ecological and economic problems. Consequently, one of the problems which the invention proposes to solve is that of developing a biostimulant and a method for treating a plant in order to effectively reduce the loss of dry matter induced by exposure to water stress.

It has to be noted that there is a real difference between growth, as such, and resistance to water stress, since the mechanisms of protection of the plant from heat or drought and those of its growth are not identical (closure of stomata, brake of sap circulation, vs. cell multiplication and elongation, respectively).

Several categories of Biostimulants are known among the existing products on the market: the use of microbial inoculants (MIs) is one practice that has attracted growing interest in recent years (Hayat, et al. 2010). These products contain living microorganisms which, when applied onto seeds, plants or in the soil during germination, play a role in the plants' growth. The MIs can contain bacterial, fungal or arbuscular mycorrhizal fungi (AMF) (Vessey, 2003; Adesemoye & Kloepper, 2009; Berg, 2009) types of living microorganisms, which can be isolated from the soil, plant residue (or live plants), water, composted manure, etc. Among the biostimulants that have been studied extensively are the soil bacteria (Plant growth-promoting bacteria, PGPB) and the rhizobacteria (Plant growth-promoting rhizobacteria, PGPR) promoting the growth of plants. All these forms of bacteria have been isolated from the rhizosphere (Bashan et al., 2014).

Humic substances (HSs) are also known. The HSs can play several roles in the soil, such as improving the availability of nutrients. As well as these functions, the HSs can induce changes in the plant's physiology and in the microorganism composition of the rhizosphere (Varanini & Pinton, 2000). The activity of these substances is highly dependent on their structural characteristics (Berbara & Garcia, 2014).

Stimulation of growth and tolerance to different biotic and abiotic stresses have been recorded in plants after they have been treated with products based on protein hydrolyzates and free amino acids. This stimulating and protective effect does not seem to be the result of improved nitrogenous nutrition (Ertani et al., 2009). Protein-based biostimulants can be classified into two main categories: (i) protein hydrolysates (PHs), composed of plant- or animal-based peptides or amino acids; and (ii) free amino acids (FAAs), such as glutamate, glutamine, proline and glycine.

Marine algae have also been long used to improve soil fertility and increase the productivity of field crops (Craigie, 2011). After the development of technical methods of liquid extraction in the 1950s (Milton, 1952), a large variety of algae extract (AE) products was marketed worldwide and used as input in agriculture (Craigie, 2011). Initially, these extracts were described as chelators improving the use of mineral elements and soil aeration (Milton, 1964). Algae extracts are now known for their biostimulant roles in activating several processes, such as germination, vegetative growth, flowering, and response to biotic and abiotic stresses, which improves yields and the harvesting process (Norrie & Keathley, 2005; Mancuso et al. 2006; Hong et al. 2007; Rayorath et al. 2008; Craigie, 2011; Mattner, et al., 2013). In the market, a large proportion of AEs are produced from brown (marine) algae such as *Ascophyllum nodosum, Fucus, Laminaria, Sargassum* and *Turbinaria* spp (Hong et al. 2007; Sharma et al. 2012). Often used in low doses (diluted to 1:1000 or more) in agriculture, several scientists rule out a fertilizing effect (Khan et al. 2009).

Algae extracts can contain a large range of organic molecules of minerals and include polysaccharide complexes absent in land plants, such as laminarin, fucoidan, alginates and hormones (Rioux et al. 2007; Khan et al. 2009).

On the other hand, very few plant extracts are known to act as Biostimulant or stimulator of the growth of plants, or of their root system.

SUBJECT OF THE INVENTION

The present invention aims to find an effective solution for stimulating the growth of plants and their root development, thanks to a plant extract based on plants from the genus *Rocket*, which presents no hazardous toxicological profile, and respects the environment and all life forms.

To this end, according to a first aspect, the present invention envisages a biostimulant that is the subject of claim 1, a use of crushed material that is the subject of claim 14, and a method for speeding up the growth of a plant that is the subject of claim 15.

It is noted here that *Rocket* ("*Eruca sativa*") is an annual plant of the Brassicaceae (or Cruciferae) family, with white or yellowish flowers veined with brown or purple, whose generally elongated, pinnately incised leaves have a pungent peppery flavor. Depending on the region, it is also known as rucola, arugula, rouquette or riquette. Riquette is a wild form of *Rocket* with very tasty small leaves. Other related plants, from the genus *Diplotaxis*, are called Rocket. When they need to be differentiated, *Diplotaxis rockets* are called "wild rocket" and *Eruca* rockets "garden rocket". The present invention is not restricted to these rocket species, and extends beyond *Eruca sativa. Rocket*'s description can also vary depending on its origin and regions. It is noted that common names for *Rocket* plants also include Rucola and Arugula.

Preferably, the *Rocket* utilized by the present invention is of the genera *Eruca* (*Eruca sativa, Eruca vesicaria,* etc), *Diplotaxis* (*Diplotaxis erucoides, Diplotaxis tenuifolia, Diplotaxis muralis,* etc), *Bunias* (*Bunias erucago, Bunias orientalis*, etc), *Erucastrum* (*Erucastrum nasturtiifolium, Erucastrum incanum,* etc) or *Cakile* (*Cakile maritima*, etc). For the purposes of the present invention, *Rocket* comprises all these plants, possibly mixed. The *Rocket* plants mentioned belong to the Capparales order and to the Brassicaceae family . . . .

It is also noted that the active ingredient, or active substance, of a product for promoting a plant's development is all that product's ingredients that have a favorable effect on a plant's development.

Plant development comprises plant growth, including root growth, and the precocity of the plant in question.

Plant growth, for a plant, is all the plant's irreversible quantitative changes that occur over time. Growth is a datum that can be expressed as unit of length per unit of time, or as unit of mass per unit of time. Growth comprises, in particular, the lengthening of the internodes and roots, the multiplication of cells and/or their extension, and the growth of leaves.

Precocity refers to a living organism reaching its mature state more quickly than the average for the species under the same conditions (seasons, environmental parameters, etc). In plants, the precocity induced by the use of crushed material that is the subject of the present invention, can be measured/quantified by noting the appearance of different physiological stages (first leaves, first flowers, first fruit, etc) for the plants treated, compared to the physiological stages for plants of the same species that have not been treated by the use of crushed material that is the subject of the present invention.

The stimulation of root growth is characterized by a change in the root system (shortening or lengthening of the primary root, shortening or lengthening of the secondary roots, appearance of root hairs, etc). This stimulation by the use of crushed material that is the subject of the present invention can be measured by comparing the root system of treated and untreated plants.

Such a composition can consist of a total crude extract obtained by extraction from the plant of the genus *Rocket*, of a fraction enriched in the active compound(s) of such a total extract, or of one or a plurality of active compound(s) in a mixture. Such a composition advantageously makes it possible, when present in an effective amount, to speed up plant growth, in particular for lettuces, vegetables and other plants intended for human or animal consumption, and for ornamental plants, trees and shrubs.

In some embodiments, at least one active ingredient is obtained from leaves of plants from the genus *Rocket*.

The inventor has discovered that the leaves of plants from the genus *Rocket* contain particularly effective active ingredients for promoting plant growth.

In some embodiments, at least one active ingredient is obtained from seeds of plants from the genus *Rocket*.

In some embodiments, at least one active ingredient is obtained from flowers of plants from the genus *Rocket*.

In some embodiments, at least one active ingredient is obtained by grinding at least one part of plants from the genus *Rocket*.

In some embodiments, at least one active ingredient is obtained by aqueous extraction solvent extraction, or by extraction of oil cakes or pastes. It is recalled here that oil cakes are the solid residue obtained after extracting oil from oleaginous seeds or fruit.

In some embodiments, the composition that is the subject of the present invention is formulated in the form of powder, granules, dispersible granules or slow-diffusion granules.

In some embodiments, the composition that is the subject of the present invention is formulated in liquid form.

According to a second aspect, the present invention envisages a use of a composition that is the subject of the present invention for promoting plant growth or stimulating root growth.

According to a third aspect, the present invention envisages a method for speeding up the growth of a plant, comprising the application on said plant of a composition that is the subject of the present invention.

In some embodiments, the application on the plant is achieved by foliar spray, watering the soil, drop-by-drop irrigation, use in hydroponics, seed treatment and/or seed coating.

According to a fourth aspect, the present invention envisages a method for producing a composition, comprising a step of grinding at least one part of plants from the genus *Rocket* to provide crushed material, and filtering solid portions of said crushed material to obtain a liquid.

As the particular features, advantages and aims of this use and of these methods are similar to those of the composition that is the subject of the present invention, they are not repeated here.

BRIEF DESCRIPTION OF THE FIGURES

Other advantages, aims and characteristics of the present invention will become apparent from the description that will follow, made as an example that is in no way limiting, with reference to the drawings included in an appendix, in which:

FIGS. 21 and 22 represent, in the form of tables, measurements of various ecophysiological parameters during the use and the method that are the subjects of the present invention;

DESCRIPTION OF EXAMPLES OF REALIZATION OF THE INVENTION

In general, the present invention concerns the use of crushed material obtained from at least one part of "*Rocket*" plants for:

- stimulating the root growth of plants;
- stimulating plant growth;
- precocity of plant growth;
- increasing the production of flowers and/or seeds and/or fruit; and/or
- the resistance of plants subjected to water stress.

The crushed material, which serves to supply the biostimulant that is the subject of the present invention, can be used by foliar spray or watering the soil.

Figure 1:
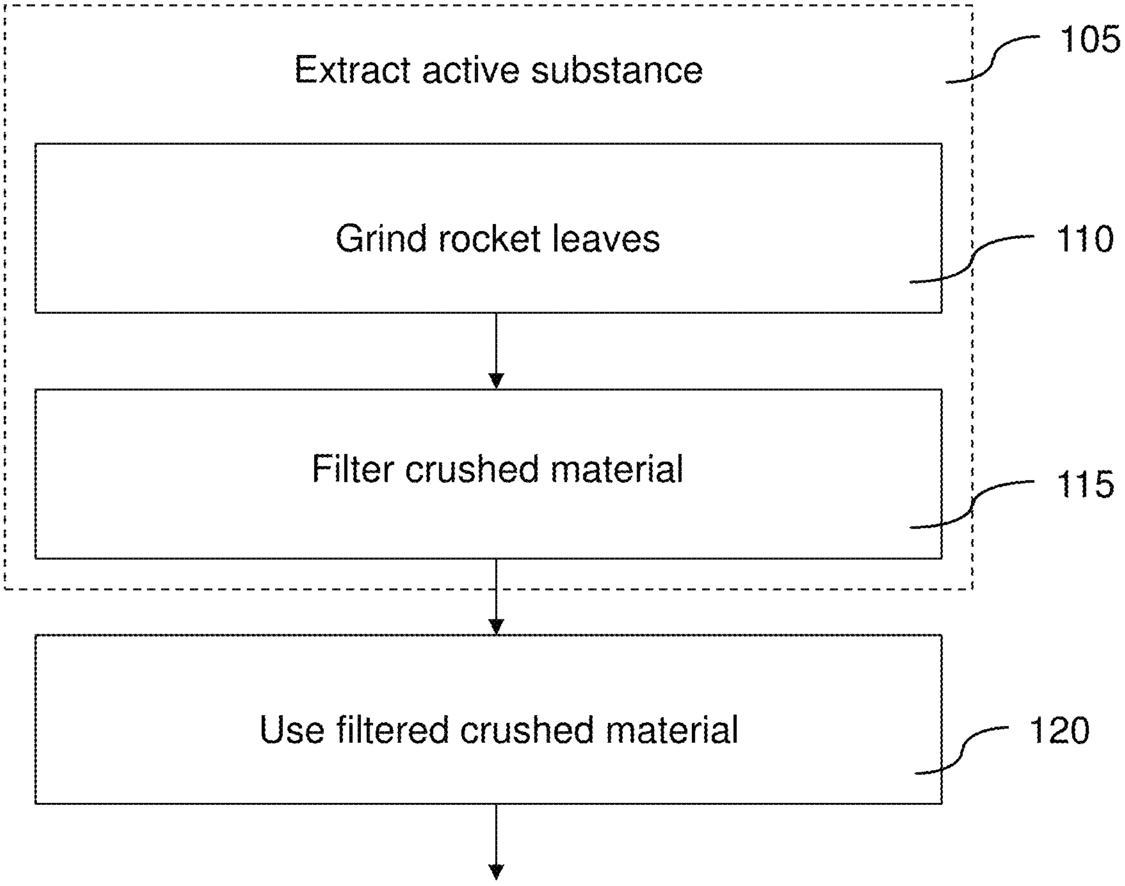
FIG. 1 represents, in the form of a logical diagram, steps in a particular embodiment of the method for producing and using crushed material that is the subject of the present invention.

As shown in FIG. 1, in an embodiment, the method for producing and using the crushed material that is the subject of the present invention comprises a step 105 of extracting a *Rocket* extract. For example, this extraction is carried out according to the following procedure:

during a grinding step 110, the *Rocket* leaves are ground finely in tap water, for fifteen minutes, in a suitable mixer device to obtain a homogenous crushed material;
during a filtering step 115, the crushed material is filtered to separate the leaf matter and obtain a green-colored liquid without leaf residue, which constitutes a crushed material used as a biostimulant.

In a variant, at least one active ingredient of the crushed material is obtained by aqueous extraction or solvent extraction.

In a variant, at least one active ingredient of the crushed material is obtained by extraction of oil cakes or pastes of *Rocket.*

For the use of this crushed material, during a step 120, this liquid crushed material is sprayed at foliar level on the plants to be treated, or used in watering the soil.

The inventor has discovered that the use of crushed material has a significant effect on the growth of plants.

It is noted that the liquid crushed material obtained at the end of step 115 can be formulated to make it easier to use. For example, it is used in the form of powder, granules, dispersible granules or slow-diffusion granules, depending on the formulation chosen and the envisaged uses. The formulations are realized using the crushed material from the extraction step 105.

Active fractions may potentially be purified, by any means whatsoever, to facilitate the formulation. Different extraction steps can be added to improve its quality.

The crushed material can be diluted in water depending on the required dose, at the time of its use.

With respect to the use and formulation of the crushed material, the finished product, or biostimulant which is formed from this crushed material, can be applied in any form whatsoever (liquid, powder, soluble powder, granules, dispersible granules, slow-diffusion granules, etc formulation) depending on the uses and the formulation chosen. The crushed material that is the subject of the present invention can be used by foliar spray, watering the soil, drop-by-drop irrigation, use in hydroponics, seed treatment, seed coating, etc.

The crushed material can be used at a rate of between one day and one hundred and twenty days, or continuously, or according to the key growth stages of the plant, in accordance with best agricultural practices and the treatment schedules for each plant species. The crushed material can be mixed with other products (phytosanitary products, growing mediums and fertilizing material, fertilizers, or any other product intended for agriculture). The application doses and the rates of application are adapted to the uses and the plant types. The application doses are, for example, between 0.01 g/L and 12 g/L.

The crushed material can be used as root growth stimulator and for stimulating plant growth. The crushed material, used for watering the soil, or as a foliar spray, seed treatment or seed coating, makes it possible to increase root growth (growth of secondary roots, production of root hairs, etc) and stimulates the growth of the plant (increased number and size of fruit, earliness of the harvest, increased foliar growth, etc).

The BBCH method is widely employed in smart farming and recommended by the vast majority of scientists working to establish a link between phenology and industrial agriculture. In the BBCH scale, plant development is broken down into principal and secondary plant growth stages, both numbered 0-9. To avoid substantial shifts from the phenological approach widely used earlier, BBCH adopted a decimal code based on the well-known Zadoks cereal scale. The standard BBCH scale is used for any species that lacks a dedicated scale or serves as a framework within which individual scales can be developed. The following are ten stages of plant growth in the BBCH scale:

Stage 0: Germination, Sprouting, Bud Development

Despite their distinct biological processes, germination, sprouting, and bud development were all lumped under the same primary plant growth stage. Depending on the type of crop, growth phase 0 can last anywhere from a few days to a few weeks. At this point in the plant's development, the seed has sprouted and produced what are called "seed leaves," which are easily distinguished from the mature leaves. Primarily, the germination and budding stage of plant growth requires the right temperature and oxygen levels. Additionally, it depletes the nutritional reserves of plants, potentially leading to nutrient deficiency without additional fertilization. A state of dormancy is often needed beforehand. At growth phase 0, the crop constantly requires water to kickstart a healthy metabolism. A shoot becomes a seedling when it is above ground.

Stage 1: Leaf Development

The leaf's photosynthetic power is the foundation upon which the entire plant builds. Thus, stage 1 of plant growth is essential for the crop's normal development. All the plant nutrients by this stage of growth will help it through the next phases of its development. At growth stage 1, the plant produces "genuine" or "mature" leaves, which are miniature copies of the fully developed leaves. Leaf development is guided by a universal fundamental program, varying a little to suit the needs of individual species and environmental conditions. Leaves develop into flat structures of varying sizes and shapes, beginning on the shoot's apical meristems. Hormones in plants, as well as transcriptional regulators and mechanical qualities of the tissue, all play a role in controlling this process.

Stage 2: Side Shoots Formation or Tillering

Tillering is the plant growth stage during which new aerial shoots form. Rather than spreading out like rhizomes and stolons, tillers grow vertically. The outcome is a considerable rise in the number of new shoots occurring immediately adjacent to the initial shoot. "Daughter plants" occasionally refer to the new shoots that develop from the "parent plant." Tillering can also mean the development of side shoots. Each new shoot comprises a central growth point, which eventually develops into a jointed stem defined by nodes and internodes similar to a bamboo pole.

Stage 3: Stem Elongation or Rosette Growth and Shoot Development

Some parts of the plant, like stems and roots, keep growing throughout the plant's life: this process is called indeterminate growth. New cells are produced at the tips of growing shoots. Growth in stems occurs at many different sites, unlike just a few in the root system. The duration and intensity of these changes vary between species, but individual crops within a single species tend to comply with some norms. Global warming significantly impacts the plant at growth stage 3 of its growth due to the direct correlation between temperature and stem elongation.

Stage 4: Development of Vegetative Plant Parts or Booting

The development of strong stems and plenty of green leaves characterizes the vegetative stage of plant growth. These processes are critical because photosynthesis relies on sufficient leaf surface area to absorb light. Notably, healthy leaf development usually follows strong root growth.

Stage 5: Inflorescence, Emergence or Heading

Inflorescence emergence is the process by which a cluster of flowers is arranged along a floral axis. Heading refers to the process by which a seed head emerges from the sheath formed by the flag leaf. The fact that this is the start of the reproductive growth phases is the unifying factor that groups these two different biological processes into one phase of plant development. At growth stage 5, a plant's primary focus shifts from vegetative expansion to developing reproductive structures such as flowers and then fruits.

Stage 6: Flowering

During growth stage 6, flowering plants create the reproductive structures necessary for sexual reproduction. Annuals only live for one year, and their flowering and subsequent demise coincide. In biennials, the first year is spent in the vegetative phase, and the second is devoted to flowering and dying. Most perennials will continue to bloom every year if the conditions allow. Flowering is among the critical stages of crop growth for irrigation. The advent of gibberellin, a plant hormone, a specific temperature, and the length of day and night (photoperiod) are the most common triggers for flowering in many plants. Without a period of wintertime cold, the flowering time of many annual plants (such as winter wheat) and biennial plants is delayed. Vernalization describes the transformation that results from this extended period of frigid temperatures.

Stage 7: Development of Fruit

There has been a lot of focus in plant biology and horticulture on the plant growth stage when fruits are developing. In most flowering plants, fruit development occurs in the ovary after fertilization. A mature ovary is called a "fruit" because of its edible qualities. The fruit is a safe haven for the growing embryo and its seeds since it encloses them.

Fleshy fruit development is generally broken down into four phases

In the first phase, known as floral development, the identity, number, and shape of floral organs are established.

With fertilization comes the onset of the second phase, cell division.

In the third phase, cells undergo fast expansion and endoreduplication until ripening begins.

The fruit's flavor, texture, nutritional components, and appearance are determined during the ripening stage, the fourth phase that begins after fruit growth stops.

At this point, plants can continue to develop without the need for nitrogen.

Stage 8: Ripening and Maturity of Fruit and Seed

At the ripening stage of plant growth, fruits typically respond to a ripening signal: a surge in ethylene production. Infection with bacteria or fungi, as well as harvesting the fruit, can stimulate the synthesis of ethylene, signaling the ripening process. As soon as the fruit gets this ethylene signal, it goes through a series of changes that lead to it ripening. To put it another way, new enzymes are manufactured. Enzymes such as amylase and pectinase aid in the digestion of starch and pectin, respectively, and hydrolases assist in breaking down compounds within the fruits. The genes responsible for the transcription and translation of these enzymes are turned on by ethylene. Enzymes catalyze reactions that modify the fruit's properties: color, texture, flavor, and scent.

Stage 9: Senescence and Beginning of Dormancy

There are telltale signs of senescence: degenerative alterations in the cells, commonly linked to an increase in waste products and a change in metabolism. Plant senescence is regulated by many environmental factors, the most prominent of which are photoperiod and temperature. The onset of winter dormancy is signaled by leaf drop in perennial plants. Towards the end of the growing season, shorter days and cooler temperatures trigger leaf senescence in many trees. The green chlorophyll disappears, and the yellow and orange carotenoid pigments become more noticeable. The length of the day may govern leaf senescence in deciduous trees through its effect on hormone metabolism.

Trees are particular plants. Their development is similar but vocabulary may differ.

Tree Seed.

Some tree seeds have a protective shell like a nut. Other seeds are contained in fleshy fruits. Certain maples and sycamores have helicopter-like seeds that twirl to the ground called "samaras." Over millennia, seeds have evolved into different types and shapes so they can be dispersed by wind, water or animals. Each seed has all the resources it needs to survive until it reaches a favorable place to sprout and grow.

Tree Sprout.

If certain environmental conditions are met, germination of the embryo contained in the seed can occur. The embryo depends on the supply of food stored in the seed for the energy necessary to grow, expand, and break through the seed coat. Once the seed has found the right conditions, it needs to secure itself. The first root breaks through the seed, anchoring it and taking in water for the developing plant. The next stage in germination is the emergence of the embryonic shoot. The shoot pushes up through the soil, with the shoot leaves either poking above ground or rotting underneath as the rest of the shoot grows above. The root grows down into the soil to search for water and nutrients, while the sprout pushes upward seeking sunlight. If the sprout succeeds, the leaves will develop and allow the tree to create its own food through photosynthesis.

Seedling

A shoot becomes a seedling when it is above ground. The sprout grows and gradually takes on woody characteristics. The soft stem begins to harden, change from green to gray or brown, and develop a thin bark. More leaves or needles sprout from newly formed branches seeking light. The tree roots also continue to grow and branch out. The majority of the tree's roots are near the surface of the soil, in order to absorb available water and nutrients and to breathe, as roots also require oxygen.

Sapling

A tree becomes a sapling when it is over 3 feet tall. The length of the sapling stage depends on the tree species, but saplings have defining characteristics: flexible trunks, smoother bark than mature trees and inability to produce fruit or flowers. However, according to the Texas A&M Forest Service, a tree is generally considered to be in the sapling stage when it is between 1 and 4 inches in diameter at 4.5 feet. This is the standard height where a tree's diameter is measured, known as the "DBH" or "diameter at breast height." It is in the juvenile stage of its life, when it is yet unable to produce fruit or flowers. The length of this stage depends on the species of tree, and trees with longer overall lifespans will generally be saplings for a longer period.

Mature Tree.

A tree becomes mature when it starts producing fruits or flowers, and can begin the reproductive process of dispersing seeds. Again, how long it remains in this productive stage will depend on the species. During this stage in the life cycle, a tree will grow as much as its species and site conditions will permit.

Decline and Snag.

Many factors can contribute to the death of trees. Usually it is a combination of conditions, such as injury, drought, disease, rot, and insects, to name a few.

The biostimulant and the method that are the subject of this invention can be applied to the plants and trees at any stage of their development. However, the application of this biostimulant and this method are particularly efficient for germinated plants and trees and more particularly after stage 0 of the BBCH code of development, or during and after seedling, and even more particularly after stage 1 and before stage 9, or between (and including) side shoots formation and maturity of fruits and/or seeds. As shown in many examples given in the description, the biostimulant and process that are the subject of the invention proves particularly efficient during stages 3 to 8 of the BBCH code of development.

Elements showing the effectiveness of the composition that is the subject of the present invention are given below.

Statistical processing of the data: An analysis of variance was performed on the results of each reading. For each reading, the analyses were performed without including the control. When the assumptions of the analysis of variance were met, a mean comparison was performed using the Newman-Keuls test with the 5% threshold. The ranking produced by this test is presented with the results in the form of letters (a, b, c).

The means followed by the same letter are not significantly different.

1/ Tomatoes

The finished product produced from the *Rocket* (*Eruca sativa*) crushed material, applied at a rate of ten days, allowed the number of tomatoes per plant and the total harvest weight to be increased significantly. Using the crushed material that is the subject of the present invention (here labeled "FERTI01") was more effective than using the chosen baseline product, Osiryl (registered trademark) root growth stimulator, approved in France under marketing authorization number 1030003, referred to, below, as the baseline.

For tomatoes, the application methods comprised watering the soil utilizing a liquid formulation. Table 1 shows the effectiveness of using crushed material that is the subject of the present invention on tomatoes, for a control plant, a plant treated with the baseline product.

TABLE 1

Effectiveness on tomatoes (20 plants/method)

| Crop | Reading | Dates | Control | Baseline | FERTI 01 |
|---|---|---|---|---|---|
| Tomato *Lycopersicon esculentums* MILL. | Mean number of tomatoes per plant over the harvest period | Harvests Jul. 2, 2011 to Jul. 30, 2011 | 9 a | 11.25 ab | 14.50 b |
| | Total harvest weight (kg) per method | | 25.65 a | 31.75 ab | 43.80 b |

Figure 2:
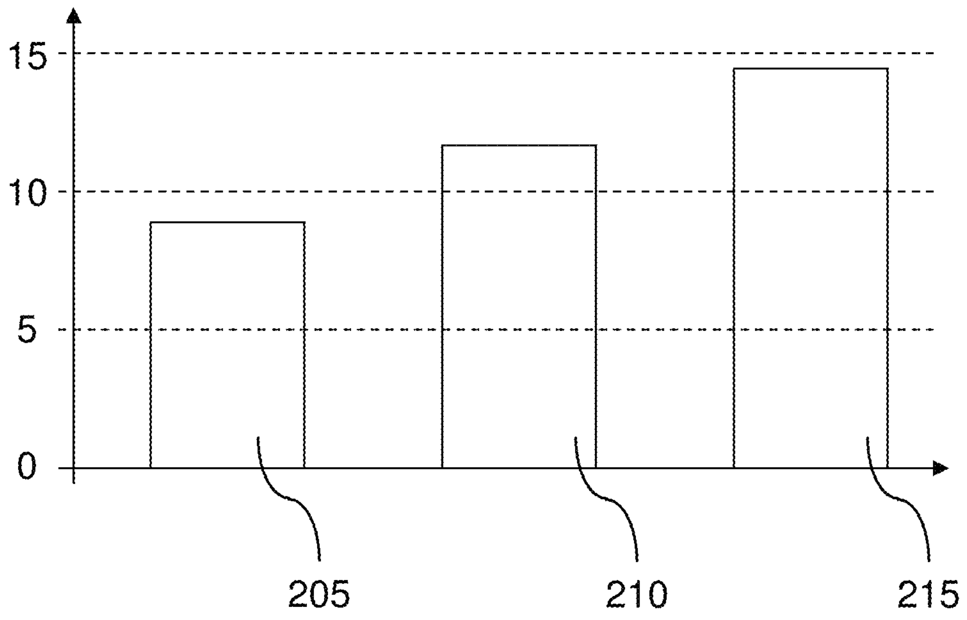
FIGS. 2 to 10 show, in the form of graphs, comparisons of results obtained with the use of the crushed material that is the subject of the present invention.

FIG. 2 shows the mean number of tomatoes per plant and per method, from table 1. It shows the mean number of tomatoes per control plant 205; the mean number of tomatoes per plant treated with the baseline product 210; and the mean number of tomatoes per plant treated with the finished product from the crushed material 215.

Figure 3:
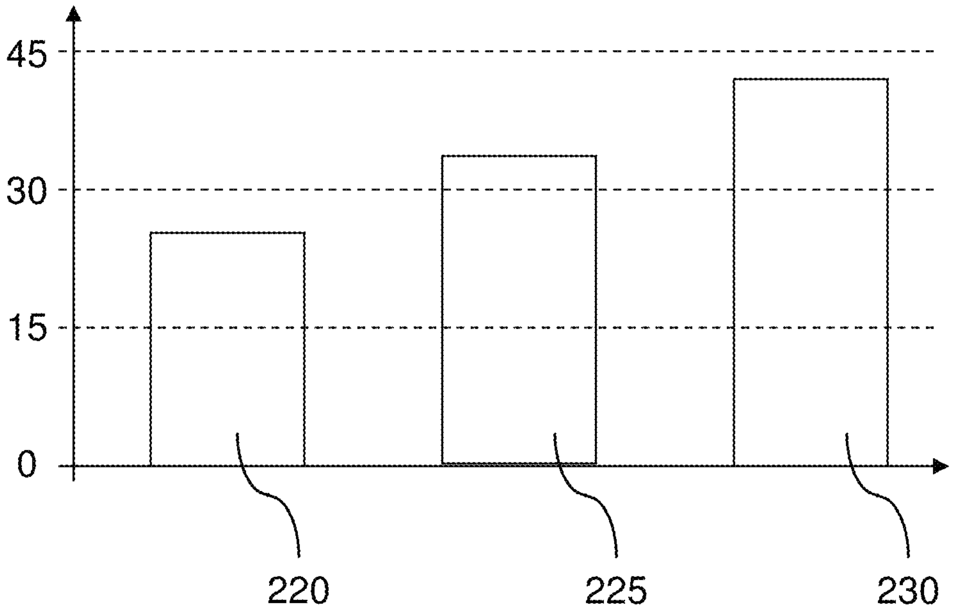

FIG. 3 shows the total weight (in Kg) of tomatoes harvested per method over the harvest period, from table 1. It shows the total weight of tomatoes harvested in the method of control plants 220; the total weight of tomatoes harvested in the method of plants treated with the baseline product 225; and the total weight of tomatoes harvested in the method of plants treated with the finished product from the crushed material 230.

In the trial conditions, the effectiveness of using crushed material that is the subject of the present invention on tomatoes has therefore been demonstrated, in comparison to the baseline product approved in France, which is a root growth stimulator.

For this trial, seven applications were carried out, at ten-day intervals. The observations were recorded for the tomatoes harvested over a 28-day harvest period.

The results show that the mean number of tomatoes per plant for the plots treated using crushed material that is the subject of the present invention (14.50 tomatoes/plant) was higher than the mean number of tomatoes per plant in the plots not treated, or treated with the baseline product (9 and 11.25 tomatoes/plant, respectively) (table 1 and FIG. 2).

The observations also show that the total harvest weight of the plots treated using crushed material that is the subject of the present invention (43.80 kg) was higher than the total harvest weight in the plots not treated, or treated with the baseline product (25.65 and 31.75 kg, respectively) (table 1 and FIG. 3).

Seven applications, at ten-day intervals, of the finished product from the crushed material allowed the number of tomatoes per plant and the total harvest weight of the treated tomato plants to be increased significantly.

Lastly, it is noted that the results of this trial were obtained over a short harvest period (28 days).

2/ Lettuces

The finished product from the *Rocket* (*Eruca sativa*) crushed material (here labeled "FERTI01"), applied at a rate of ten days, allowed the diameter of the lettuces and the weight of the treated lettuces to be increased significantly. Using crushed material that is the subject of the present invention was statistically more effective than using the baseline product Osiryl mentioned above.

For lettuces, the methods of applying the finished product from the crushed material comprised watering the soil utilizing a liquid formulation. Table 2 shows the effectiveness of using crushed material that is the subject of the present invention on lettuces, for a control plant, a plant treated with the baseline product, and the lettuce treated using crushed material that is the subject of the present invention.

TABLE 2

Effectiveness on lettuces (10 plants/method)

| Crop | Reading | Dates | Control | Baseline | FERTI 01 |
|---|---|---|---|---|---|
| Lettuce *Lactuca sativa* | Mean diameter of the lettuces (cm) | At harvest: Mar. 12, 2011 | 20.1 a | 21.2 a | 25.33 b |
| | Mean weight of the lettuces (g) | | 280.5 a | 283.1 a | 295.3 b |

Figure 4:
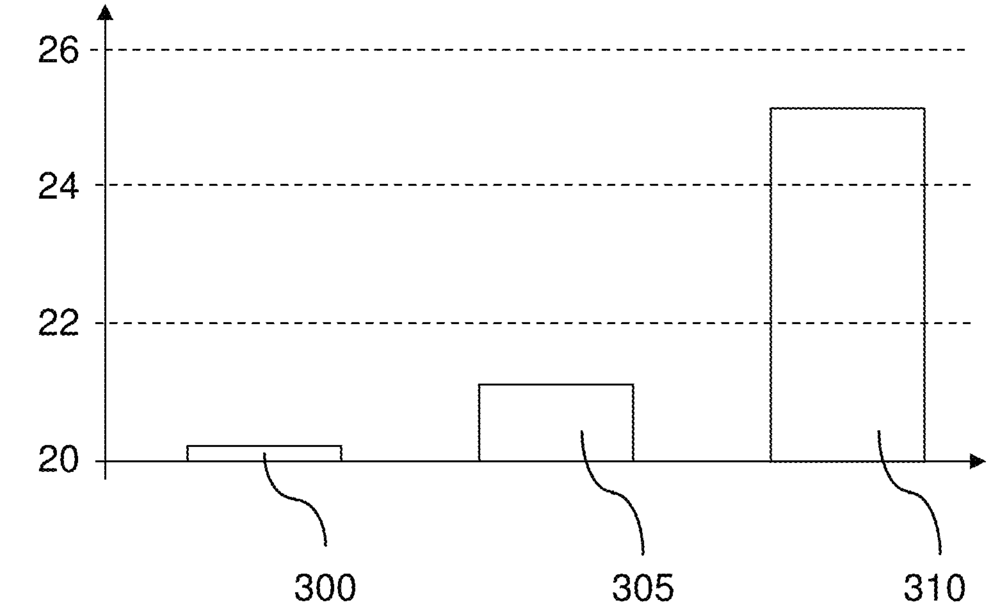

FIG. 4 shows the mean diameter of the lettuces per method, from table 2. It shows the mean diameter of the control lettuces 300; the mean diameter of the lettuces treated with the baseline product 305; and the mean diameter of the lettuces treated using crushed material that is the subject of the present invention 310.

Figure 5:
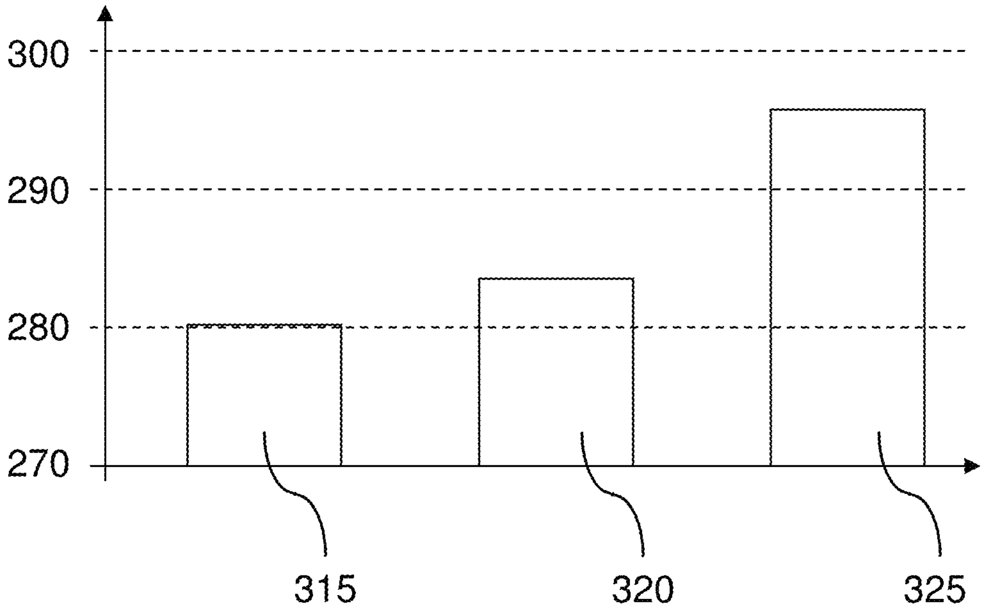

FIG. 5 shows the mean weight of the lettuces per method, from table 2. It shows the mean weight of the control lettuces 315; the mean weight of the lettuces treated with the baseline product 320; and the mean weight of the lettuces treated using crushed material that is the subject of the present invention 325.

For this trial, seven applications were carried out at ten-day intervals. The observations were recorded for the lettuces harvested.

In the trial conditions, the observations show that the mean weight of the lettuces was statistically higher for the lettuces treated using crushed material that is the subject of the present invention (295.3 g/lettuce) than for the lettuces not treated, or treated with the baseline product approved in France as root growth stimulator (280.5 and 283.10 g/lettuce, respectively) (Table 2 and FIG. 5).

Seven applications, at ten-day intervals, of the crushed material allowed the diameter and weight of the lettuces to be increased. Using crushed material that is the subject of the present invention was statistically more effective than using the baseline product.

3/ Cucumbers

The finished product from the *Rocket* (*Eruca sativa*) crushed material (here labeled "FERTI01"), applied at a rate of ten days, allowed the number of cucumbers per plant and the total harvest weight of the treated plants to be increased significantly. Using crushed material that is the subject of the present invention was statistically more effective than using the baseline product described above.

For cucumbers, the methods of applying the finished product from the crushed material comprised watering the soil utilizing a liquid formulation.

Table 3 shows the effectiveness of using crushed material that is the subject of the present invention on cucumbers, for a control plant, a plant treated with the baseline product approved in France, and a plant treated with the crushed material.

TABLE 3

Effectiveness on cucumbers (20 plants per method)

| Crop | Reading | Dates | Control | Baseline | FERTI 01 |
|---|---|---|---|---|---|
| Cucumber *Cucumis sativus* L. (CUMSA) | Mean number of cucumbers harvested per plant | Harvests Jun. 11, 2011 to Jul. 30, 2011 | 4.10 a | 7.20 b | 10.12 c |
| | Total harvest weight (kg) | | 10.25 a | 22.22 b | 29.15 c |

Figure 6:
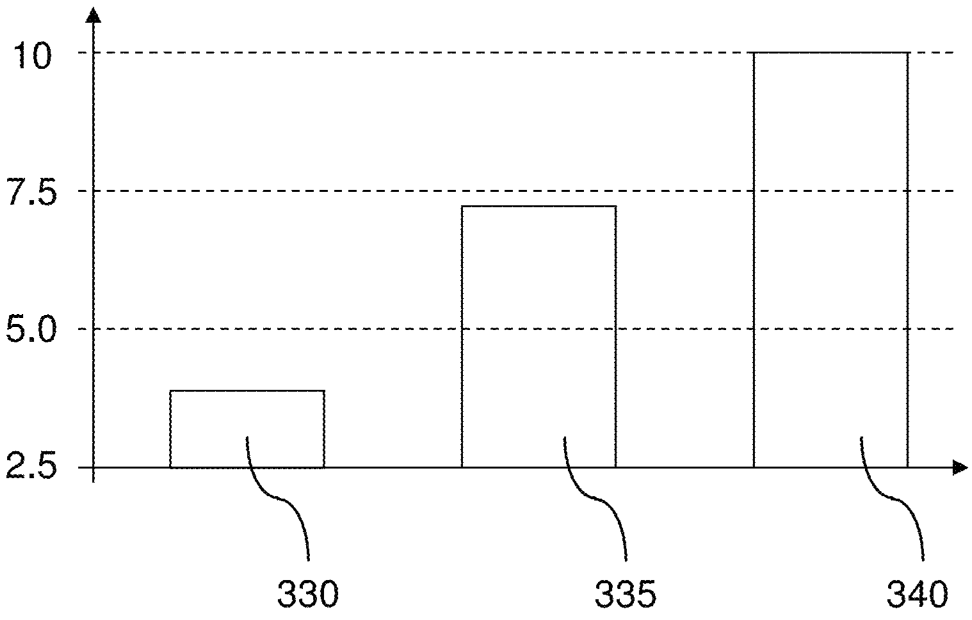

FIG. 6 shows the mean number of cucumbers per plant and per method, from table 3. It shows the mean number of cucumbers per control plant 330; the mean number of cucumbers per plant treated with the baseline product 335; and the mean number of cucumbers per plant treated using crushed material that is the subject of the present invention 340.

Figure 7:
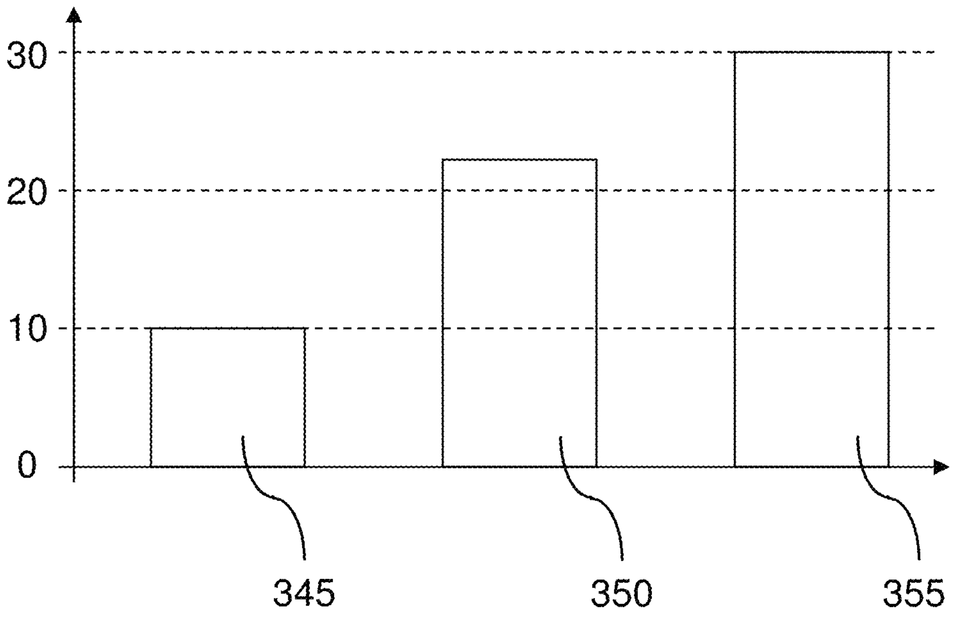

FIG. 7 shows the total weight (in kg) of cucumbers per plant and per method, from table 3. It shows the total weight of cucumbers per control plant 345; the total weight of cucumbers per plant treated with the baseline product 350; and the total weight of cucumbers per plant treated using crushed material that is the subject of the present invention 355.

For this trial, eight applications were carried out at ten-day intervals. The observations were recorded for the cucumbers harvested over a 40-day harvest period.

The results show that the mean number of cucumbers per plant during the harvest period in the plots treated using crushed material that is the subject of the present invention (10.12 cucumbers/plant) was statistically higher than from the plots not treated, or treated with the baseline product approved in France (4.10 and 7.20 cucumbers/plant, respectively) (Table 3 and FIG. 6).

The observations also show that the total harvest weight of the cucumbers harvested from the plots treated using crushed material that is the subject of the present invention (29.15 kg) was statistically higher than from the plots not treated, or treated with the baseline product (10.25 and 22.22 kg, respectively) (Table 3 and FIG. 7).

Eight applications, at ten-day intervals, of the finished product from the crushed material allowed the number of cucumbers per plant and the total harvest weight of the treated plants to be increased significantly. In addition, using crushed material that is the subject of the present invention was statistically more effective than using the baseline product.

4/ Cucumbers

The finished product from the *Rocket* (*Eruca sativa*) crushed material (here labeled "FERTI01"), applied at a rate of ten days, allowed the total harvest weight of the treated plants to be increased significantly. Using crushed material that is the subject of the present invention was statistically more effective than using the baseline product mentioned above.

Using crushed material that is the subject of the present invention also allowed the number of fertile flowers to be increased significantly. In addition, using crushed material that is the subject of the present invention was statistically more effective than using the baseline product mentioned above.

For cucumbers, the methods of applying the finished product from the crushed material comprised watering the soil utilizing a liquid formulation.

Table 4 shows, in the trial conditions, the effectiveness of using crushed material that is the subject of the present invention on cucumbers, for a control plant, a plant treated with the baseline product, and a plant treated using crushed material that is the subject of the present invention.

TABLE 4

Effectiveness on cucumbers (10 plants/method)

| Crop | Reading | Dates | Control | Baseline | FERTI 01 |
|---|---|---|---|---|---|
| Cucumber *Cucumis sativus* | Mean number of fertile flowers per plant | Before harvesting 09/15 to 07/10 | 12.25 a | 10.10 a | 16.12 b |
| | Mean number of cucumbers harvested per plant | At harvesting 10/08 to 10/31 | 3.5 a | 5.1 ab | 8.5 b |
| | Total harvest weight (kg) over the period | At harvesting 10/08 to 10/31 | 3.9 a | 6.1 a | 10.2 b |

Figure 8:
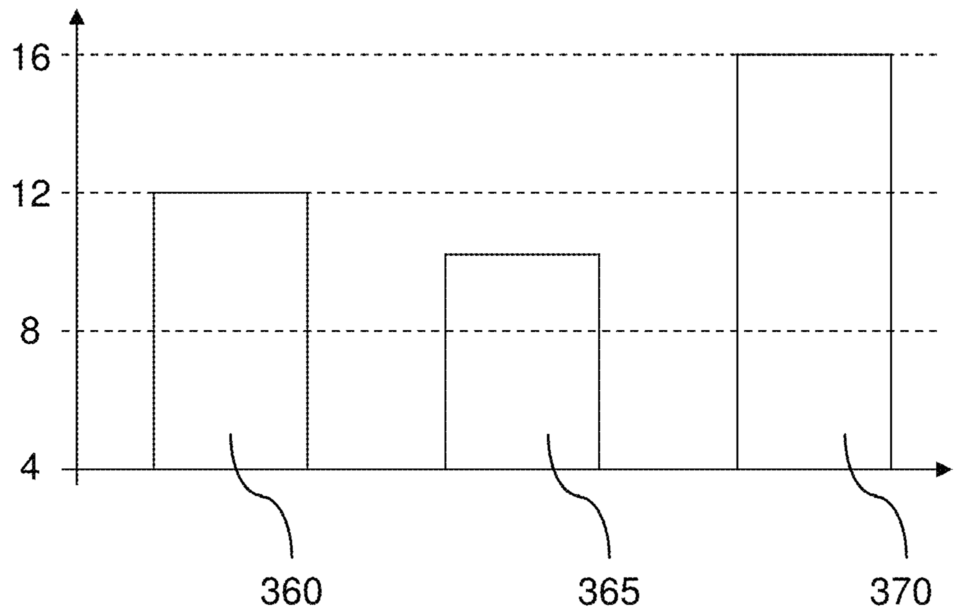

FIG. 8 shows the mean number of fertile flowers per plant and per method, from table 4. It shows the mean number of fertile flowers per control plant 360; the mean number of fertile flowers per plant treated with the baseline product 365; and the mean number of fertile flowers per plant treated using crushed material that is the subject of the present invention 370.

Figure 9:
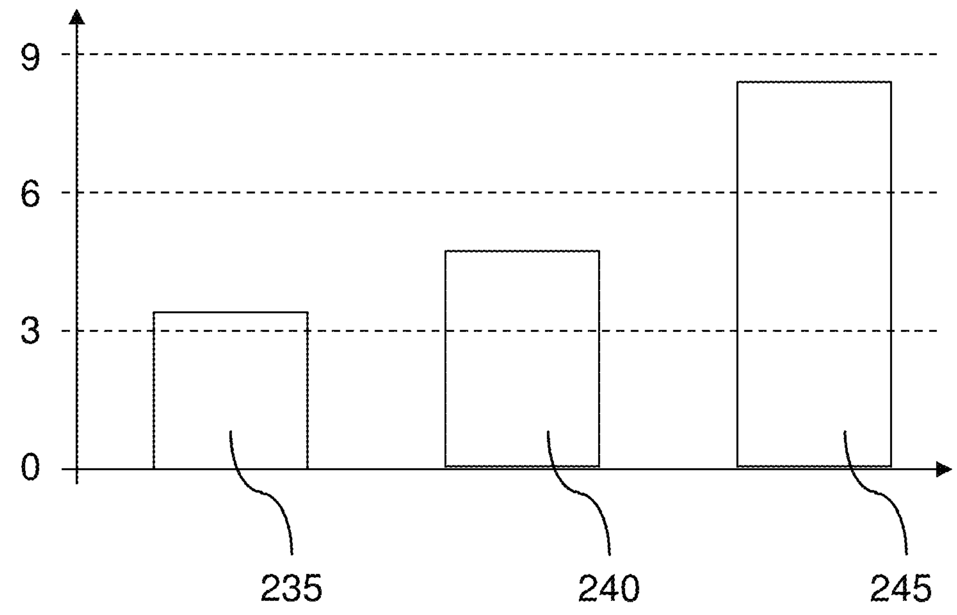

FIG. 9 shows the mean number of cucumbers harvested per plant and per method, from table 4. It shows the mean number of cucumbers harvested per control plant 235; the mean number of cucumbers harvested per plant treated with the baseline product 240; and the mean number of cucumbers harvested per plant treated using crushed material that is the subject of the present invention 245.

Figure 10:
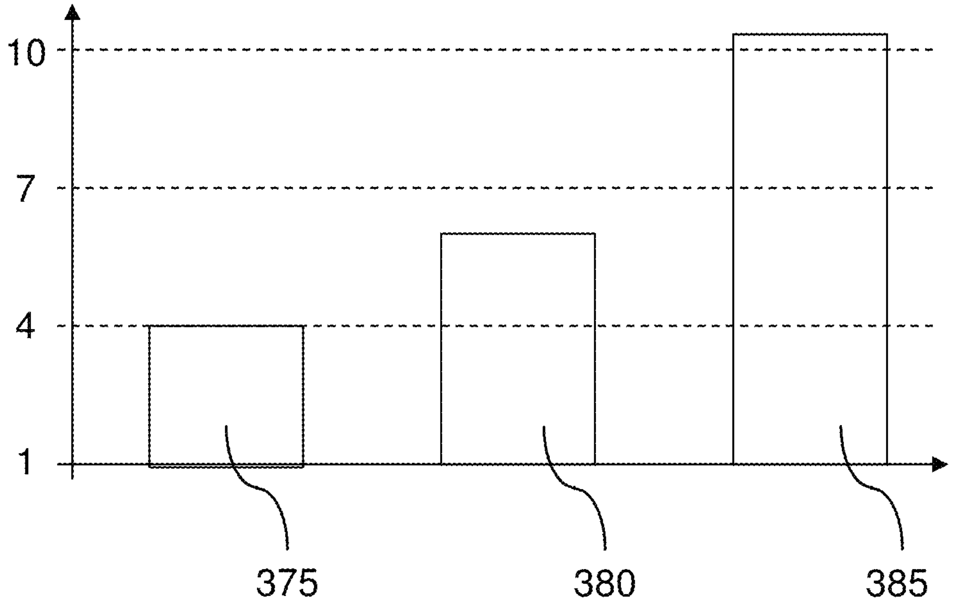

FIG. 10 shows the total weight of cucumbers harvested over the period per method, from table 4. It shows the total weight of cucumbers in the method of control plants 375; the total weight of cucumbers in the method of plants treated with the baseline product 380; and the total weight of cucumbers in the method of plants treated using crushed material that is the subject of the present invention 385.

For this trial, four applications of the tested products were carried out at ten-day intervals. The observations were recorded for the cucumbers harvested over a 23-day harvest period.

The results show that the mean number of fertile flowers per plant from plots treated using crushed material that is the subject of the present invention (16.12 flowers/plant) was statistically higher than from the plots not treated, or treated with the baseline product (12.25 and 10.10 flowers/plant, respectively) (Table 4 and FIG. 8).

The observations also show that the total harvest weight from the plots treated using crushed material that is the subject of the present invention (10.2 kg) was statistically higher than from the plots not treated, or treated with the baseline product (3.9 and 6.1 kg, respectively) (Table 4 and FIG. 10).

Four applications, at ten-day intervals, of the finished product from the crushed material allowed the number of fertile flowers per plant and the total harvest weight of the treated cucumber plants to be increased significantly. In addition, using crushed material that is the subject of the present invention was statistically more effective than using the baseline product.

It should be noted that the results of this trial were obtained over a short harvest period (23 days).

An in vitro study of cucumbers was carried out in the laboratory to support the hypothesis that the crushed material might be classified in the category of root growth stimulators. In this study, use of crushed material that is the subject of the present invention was compared to use of the baseline product Osiryl (registered trademark) root growth stimulator, approved in France under marketing authorization number 1030003.

The products tested were included in the Murashige & Skoog culture medium (0.5×) at the start of the study. The cucumber seeds were sterilized with a bleach solution, then washed three times in water. The sterilized seeds were placed on the culture medium and the Petri dishes were placed in an in vitro culture growth room for 15 days.

The observations were made at seven days and fourteen days after sowing. The results obtained are presented below.

Figure 11:
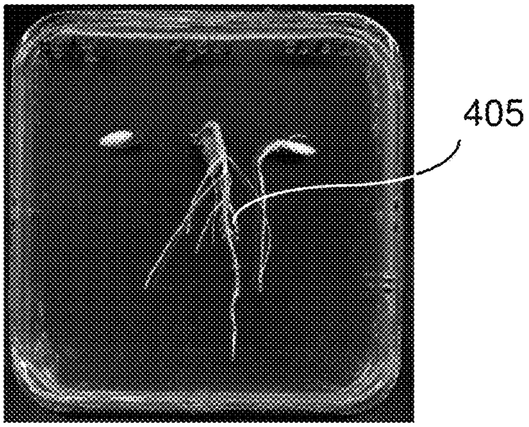
FIGS. 11 to 19 show, in the form of photographs, roots of plants treated without and with the use of the crushed material that is the subject of the present invention.
Figure 12:
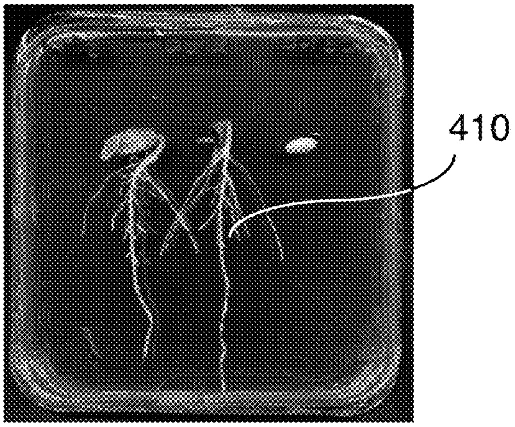
Figure 13:
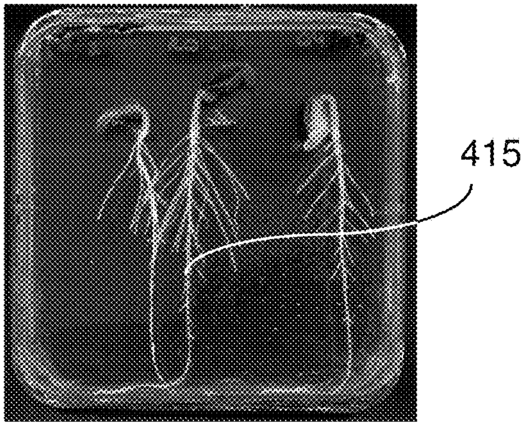

FIGS. 11, 12 and 13: photos of an observation of the products tested in an in vitro culture on cucumbers seven days after sowing. FIG. 11 shows the control 405; FIG. 12 the plant treated with the baseline product 410; and FIG. 13 the plant treated using crushed material that is the subject of the present invention 415.

Figure 14:
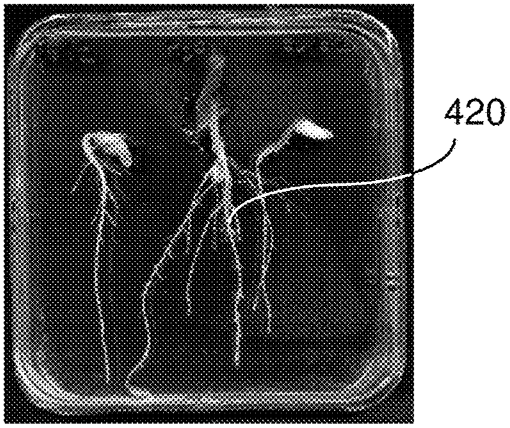
Figure 15:
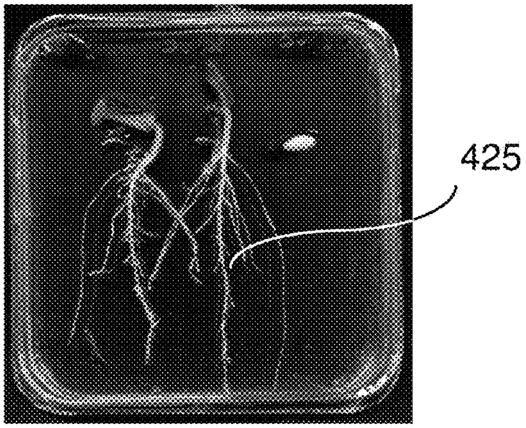
Figure 16:
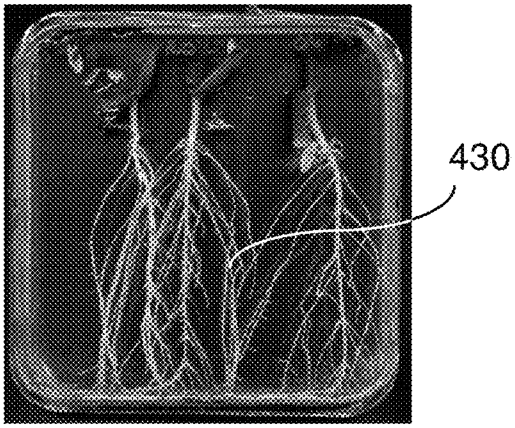

FIGS. 14, 15 and 16: photos of an observation of the products tested in an in vitro culture on cucumbers fourteen days after sowing. FIG. 14 shows the control 420; FIG. 15 the plant treated with the baseline product 425; and FIG. 16 the plant treated using crushed material that is the subject of the present invention 430.

Figure 17:
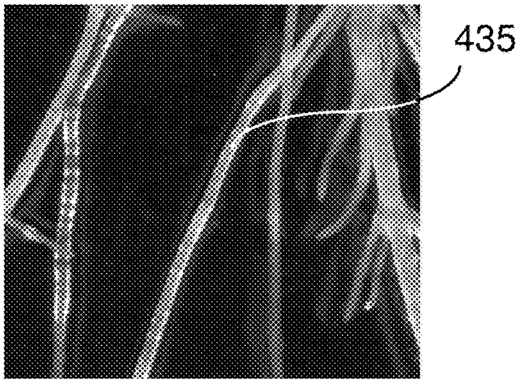
Figure 18:
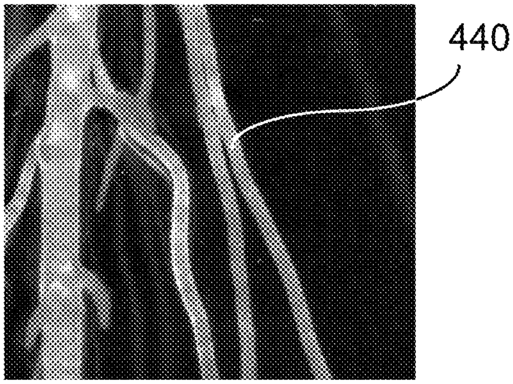
Figure 19:
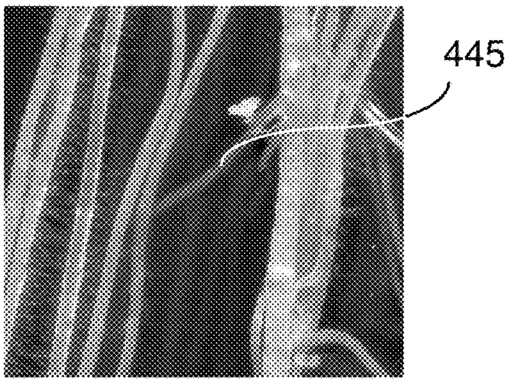

FIGS. 17, 18 and 19: photos of an observation of the products tested in an in vitro culture on cucumbers fourteen days after sowing. FIG. 17 shows the control 435; FIG. 18 the plant treated with the baseline product 440; and FIG. 19 the plant treated using crushed material that is the subject of the present invention 445.

The in vitro study on cucumbers was carried out in France, to test the finished product obtained from the crushed material compared to the baseline product Osiryl.

The observations made it possible to show that the root system was more developed when the finished product from the crushed material was included in the culture medium, compared to the control and to the baseline product. In effect, the number and size of the side roots and secondary roots were greater using crushed material that is the subject of the present invention than for the control or using the baseline product (FIGS. 11 to 16).

In addition, 14 days after sowing, root hairs were only observed in the Petri dishes containing the finished product from the crushed material (FIGS. 17 to 19).

The observations of this in vitro study show that the cucumber seeds that germinated in a culture medium with the finished product from the crushed material added, showed a much more developed root system than the seeds that germinated in the "control" medium.

5/ Soft Winter Wheat

In this preliminary experimental field trial, the finished product from the *Rocket* (*Eruca sativa*) crushed material (here labeled "FERTI01"), applied at key physiological stages to soft winter wheat (shoot 1 cm, 2 nodes, GFT/fragment, stamen emergence), allowed the total harvest weight of the treated plants to be increased significantly compared to the plots not treated (standard control).

Table 5 shows the effectiveness of using crushed material that is the subject of the present invention on the wheat harvest and on the protein content of the harvest, for a plot of standard control plants not treated, and a plot of plants treated with the present invention.

TABLE 5

Effectiveness on soft winter wheat

| Crop | Yield readings | Dates | Control | FERTI01 |
|---|---|---|---|---|
| Soft winter wheat | Qx/Ha | July 2010 | 74.9 a | 78.8 b |
| | Proteins | | 10.8 a | 11.3 b |

The general observations were:

a/ No phytotoxicity was observed, in particular no leaf burn, which is frequently observed when triazoles are used.

b/ Slight precocity (one to two days) of stages was observed, especially for heading.

c/ The difference in the harvest weight was significantly higher (four quintals more seeds per hectare) for the method treated using crushed material that is the subject of the present invention.

d/ The level of proteins, a decisive criterion in the bread wheat market for example, was significantly higher in the harvest from plots treated using crushed material that is the subject of the present invention.

The trial conditions of this preliminary trial will be improved to optimize the effects of the use of crushed material that is the subject of the present invention.

For wheat, the methods of applying the finished product from the crushed material comprised a foliar spray utilizing a liquid formulation.

6/ Maize

A trial was carried out on young maize plants in a culture room over a 52-day period (from sowing to final reading).

Below is a description of the trials concerning use of the finished product from the *Rocket* (*Eruca sativa*) crushed material, and of the method that is the subject of the present invention.

Figure 20:
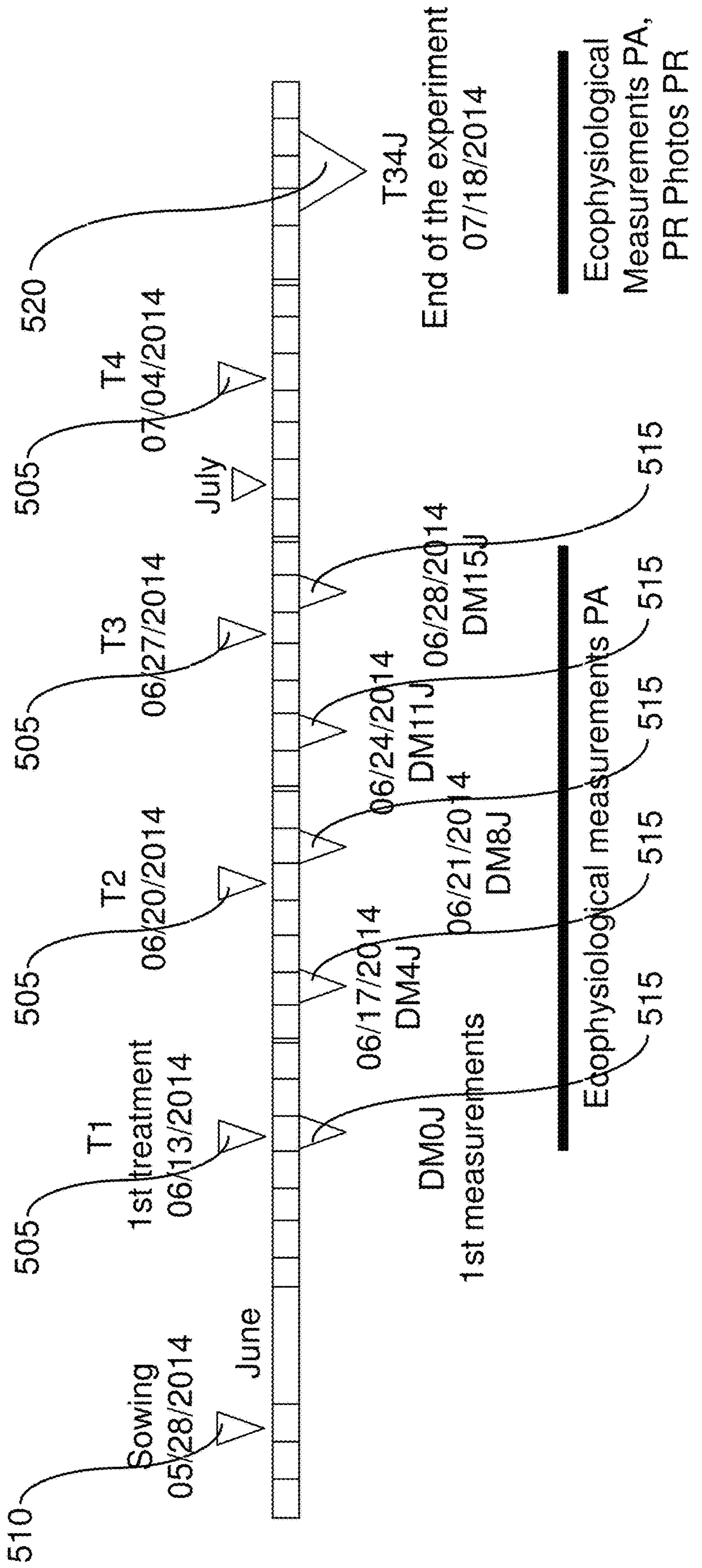
FIG. 20 represents, in the form of a time diagram, a trial procedure testing the use and the method that are the subjects of the present invention on maize.

FIG. 20 shows the trial procedure testing the crushed material on maize. Four weekly treatments (triangles 505), by spraying or watering, were applied to seedlings from the 3-leaf stage, 15 days after sowing (triangle 510). The first treatment coincided with DMOJ, the date of the first ecophysiological measurements (triangles 515), June 13. The first four measurements (DM0J, DM4J, DM11J, DM15J) concerned the aboveground portion (PA). The end of the trial (DM34J, triangle 520) also allowed physiological measurements of the root portion (PR) to be taken.

The plant material and the growing conditions of the maize are given below.

The sand, with particle size 0.2-5 mm (Filtration sand from Castorama, registered trademark) was rinsed four times with distilled water, then dried for one night in a 105° C. oven. Approximately 100 g of dried sand was used to fill over 60 small containers made of polypropylene plastic (30cl), then soaked with 40 ml of a nutritive solution prepared according to the manufacturer's protocol (GHE fertilizer). In each container, one maize seed was planted one cm below the surface to germinate. The containers were then placed in the culture chamber under controlled conditions, with a photoperiod of 16 hours, PPFD (acronym for "photosynthetic photon flux density") approximately equal to 250 μmol·m−2·s−1, humidity of 75%±5%, and a temperature of 24° C.±2° C. in the day and 20° C.±2° C. at night.

After ten days, having reached the 3-leaf stage, the young seedlings were transferred into 2-liter plastic pots filled with sand. After three days' acclimatization, the pots were evenly divided into three groups of 20 plants for the start of the treatments.

There were fifteen days between sowing and the first treatment. At the end of this period, the 60 maize plants obtained were divided into three methods: a control method (C) and two types of treatment with the biostimulant produced from the crushed material, by watering (A) and by spraying (P).

An aqueous extract supplied by the inventor at the beginning was diluted eight times. One hundred milliliters of this dilution was applied to the maize plants, added directly into the pots for method A or sprayed on the plants for method P. For method C, the pots were given 100 ml of water.

The first treatment was applied on Jun. 13, 2014. Three other treatments were scheduled on a weekly basis (FIG. 20).

During the treatments, measurements related to the plant and root growth were taken for the plants of each method, A, P and C. In total, there were four measurement dates: the day of the first treatment (DM0J), 4 (DM4J), 8 (DM8J), 11 (DM11J), 16 (DM16J) and 34 (DM34J) days later (FIG. 20). We measured all the following physiological parameters:

A/ Mean Size of the Plants:

The plant's size is the distance that separates the base of the coleoptile and the end of the plant's most developed leaf. A mean was calculated for the 20 plants in each method.

B/ Mean Growth Rate:

The mean growth rate was calculated beginning on DM4J. It corresponds to the difference in size between two adjacent measurement dates divided by the number of days between them. A daily mean was then calculated for each method.

C/ Mean Leaf Count:

The total leaf count was manually counted on DM34J.

D/ Mean Diameter of the Stem:

This measurement is the mean of the stem diameters for the 20 plants of each method (A, P, or C). The measurements began on DM11J, the date when the stem was thick enough for the measurement to be taken. The diameter was measured using a caliper rule.

E/ Measurement of the Mean Weight of the Aboveground Portion and of the Number of Leaves:

These measurements were made at the end of the trial (DM34J) on plants 44 days old. The aboveground portion was separated from the roots, then weighed with the scales. The mean weight was calculated for the 20 plants in each method. The leaf count was manually counted.

F/ Measurement of the Mean Weight of the Root System

First, the roots were removed from the pots and rinsed with water. The fresh weight of the root portion was measured with precision scales. A mean of the 20 plants was calculated for all these parameters.

G/ The Mean Chlorophyll and Flavonol Indexes:

The chlorophyll and flavonol indexes were read automatically using a Dualex portable leaf clip (Cerovic, Masdoumier et al. 2012). The device was equipped with a portable infrared light sensor, which made it possible to take non-destructive real-time measurements of the chlorophyll and flavonols of the foliar epidermis following excitation. On DM0J, leaf no. 3, starting from the base of the coleoptile, was sufficiently developed for these measurements to be taken. To ensure a uniform reading, the clip was positioned two cm from the leaf tip. The values were expressed in Dualex units. On DM34J, following the senescence of the largest portion of these third leaves, the measurement was not taken.

All these statistical tests described were carried out using the R program (Pinheiro, Bates et al. 2011). To calculate the various statistical differences between the samples, a Tukey test was carried out for a two-by-two comparison of the means of each method. Ranking according to different letters was carried out manually.

The table shown in FIG. 21 shows the measurements for various ecophysiological parameters during treatments by the use and the method that are the subjects of the present invention.

For each of the measurement dates (DM4J, DM11J, DM34J), the results show the means of the values read for 20 individuals (n=20), following treatments of the maize plants with the finished product from the crushed material by watering (A), compared to the control plants (C). The means are given a different letter when they are statistically different, P<0.05.

The table shown in FIG. 22 shows the measurements for various ecophysiological parameters (Chlorophyll index and Flavonols index) during treatments using the finished product from the crushed material. For each of the measurement dates (DM4J, DM8J, DM15J), the results show the means of the values read for 20 plants (n=20), following treatments of the maize plants with the finished product from the crushed material by watering (A) and by spraying (P), compared to the control plants (C). The means are given a different letter when they are statistically different, P<0.05.

Figure 23A:
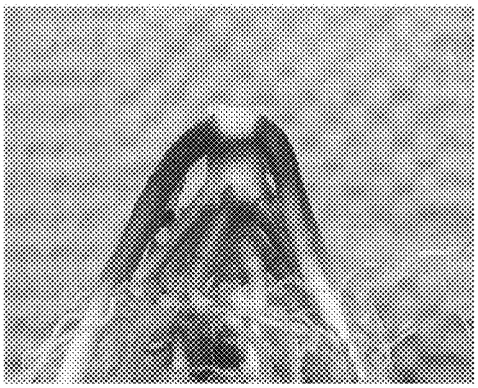
FIGS. 23A to 23F show, in the form of photographs, roots of plants treated with the use and the method that are the subjects of the present invention.
Figure 23D:
Figure 23B:
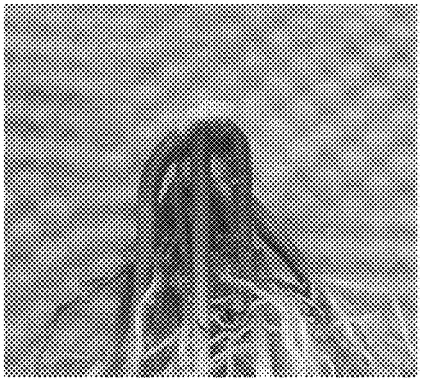
Figure 23E:
Figure 23F:
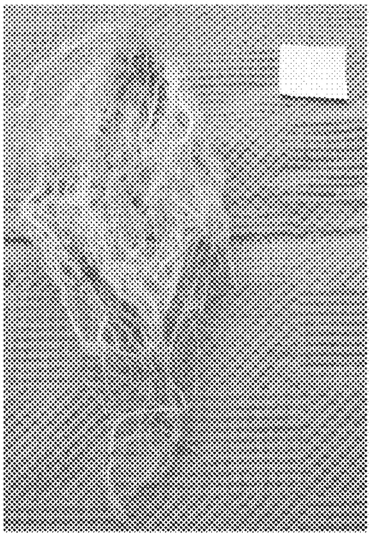
Figure 23C:
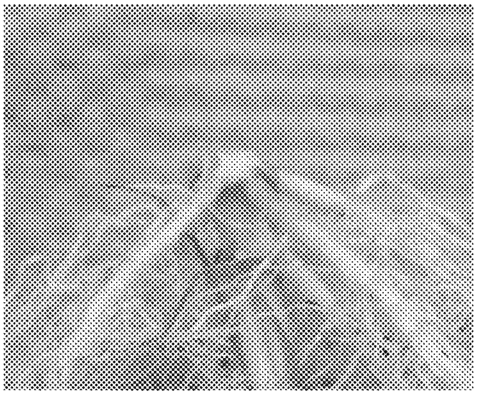

FIGS. 23A to 23F show the stimulation of the root growth under the effect of the finished product from the crushed material. The photos compare the root systems of the control method (FIGS. 23C and 23F) with the treatment by watering methods (FIGS. 23A and 23D) and the spraying methods (FIGS. 23B and 23E).

Table 6 below shows the stimulant effect of the treatment by the use and the method that are the subjects of the present invention on the mean weight of the root portion of maize plants. The results show the means for 20 plants (n=20) of the treatment by watering (A) and by spraying (P) methods compared to the control method (C). The values are given a different letter if they are statistically different, $P<0.05$.

TABLE 6

| | C | A | P |
|---|---|---|---|
| Mean weight of the root system (g) | 13.6 a | 17.3 b | 15.7 b |

Monitoring the ecophysiological parameters (FIG. 21) linked to the plant growth allowed us to assess the immediate changes occurring after application of the finished product from the crushed material. Just four days after the first treatment (DM4J), we observed that application of the finished product from the crushed material by watering (A) led to a significant increase in the size of the plants. Throughout the trial, the plants of method A remained significantly larger than those of the control method (C).

The mean growth rate values for method A remained significantly higher than those of the controls, for all measurement dates.

Like the mean size, the values recorded for the mean diameter of the plants corresponding to method A are significantly higher than the values for method C.

At the end of the treatments, the aerial biomass measurements showed a significant advance for method A compared to the Control.

The chlorophyll and flavonol indexes (FIG. 22) showed a positive development throughout the trial.

Like the plant growth parameters, these two indexes recorded an increase in value for the 2 methods A and P, with a significant difference for method P, from the 4th day after treatment. Up to DM8J, i.e., one day after the second treatment, the chlorophyll and flavonol indexes remained in favor of the plants of method P, with a significant increase compared to the control plants. At time DM15J, the Chlorophyll index showed a significant difference for method A, compared to the values read for the control method. At the same time, the Flavonol index gave values that continued to show a significant difference for method P. In general, the two indexes showed a positive development over time for methods A and P, even if the differences were not significant for each reading.

Visual inspection of the root system (FIGS. 23A to 23 F) allowed us to notice very clear changes at the level of the root phenotype between different methods. The first observation is the extended very pronounced red-purple color of the region at the base of the mesocotyl for the methods treated with the finished product from the crushed material for methods A (FIGS. 23A and 23D) and P (FIGS. 23B and 23 E). The second observation concerned the root systems for methods A and P, which seemed to the eye to be more developed than those of the control plants, confirmed by weighing the root system (Table 6).

According to the results obtained, it appears very evident that the two types of treatment, watering and spraying, led to an increase in the plant growth parameters for the maize. This increase, which occurred very early after the first treatment, i.e., after four days, showed a significant benefit for the plants treated by the product of the invention, which was maintained throughout the trial.

An important parameter, which was undoubtedly more developed in the plants watered with the product produced from the crushed material, was the root system. As well as its anchoring role, the root system plays an important role in absorbing nutrients present in the soil. Correlations between the development of root volume, following biostimulant treatments, and a better use of the soil's micro- and macro-elements has been described in several studies (Vessey, 2003; Fan et al. 2006; Canellas et al. 2011; Khan et al. 2013). The improvements observed in the development of the plants treated with the finished product from the *Rocket* crushed material may therefore be an indirect consequence of the increase in root volume, which increases the effectiveness in using the resources in the soil. The very pronounced red-purple color located at the base of the root mesophyll in the plants treated using crushed material is certainly due to the presumed accumulation of phenolic compounds. The accumulation of these compounds, currently of an unknown nature, can give a preliminary idea for one physiological effect, amongst several, of the finished product from the crushed material on the plant.

The accumulation of phenolic compounds in the plant organs is often a reactive response to environmental stimuli, here making it possible to see a concrete metabolic reaction of the maize plants to the treatment by the product that is the subject of this patent.

The Applicant has found that the biostimulant of the invention, applied to the plant in cultivation as a preventive measure, i.e., before the stress occurs, or as a curative measure, i.e., after the stress occurs, made it possible to reduce the harmful effects of water stresses, in particular the loss of dry matter and therefore of the yield per hectare. In particular, the biostimulant and the treatment method according to the invention induce an overall strengthening of the vigor of the plant. Depending on environmental conditions, this effect may result in maintaining or restoring an optimum yield while the crop is placed under water stress conditions. The description and the examples presented in the description show in particular that the effects of the invention result in an adaptation of the plant (physiology, growth, metabolism, etc.) which enables it to fight against water stresses and to maintain or restore the production of dry matter.

In general, water stress is the cause of a decrease in the yield/production of dry matter and results from drought (lack of water or water stress), extreme temperatures (heat stress), wind, soil salinity (salt stress). In practice, stimulation of root system development makes it possible to enlarge the water reservoir accessible to the plant. The size of the water reservoir accessible to the plant and the rate of consumption of this reservoir are therefore modulated by signals whose transmission involves the biostimulant of the present invention. The effect of the biostimulant applied by coating the seed lasts over time, since the plants treated with the biostimulant of the invention are more tolerant to water stress. In practice, the young seedling is more fragile than the adult plant with regard to water stresses. A young plantlet that has received a treatment with the biostimulant according to the invention reaches a state of so-called complete maturity ("adult" state) more quickly than a plantlet which has not received this treatment.

In practice, the biostimulant according to the invention is applied by spraying the leaves, sprinkling, irrigation, coating the seed, coating the seed, drip or gravity watering the cultivated plant, by addition to a culture medium in hydroponics or aeroponics.

For the purposes of the invention:

"Foliar spray" refers to a pressurized biostimulant projection forming a large number of microdroplets which then cover the upper side and/or bottom of the leaf;

"irrigation" and "watering the soil" refer to a supply of water in the soil solution captured by the root system of the plant; and "coating the seed" refers to the immersion of the seed in a solution or a powder comprising the biostimulant to produce a dry layer comprising the biostimulant around the non-germinated seed.

Advantageously, the biostimulant is applied by foliar spraying at a rate of 0.1 Uha to 15 L/ha, preferably at a rate of 1 L/ha to 5 L/ha on the cultivated plant, preferably at the ground cover stage by the leaves of the plant, with 0.1 to 10 grams of dry extract par liter, preferably with 0.5 to 5 grams of dry extract per liter. According to one particular embodiment, the biostimulant is applied as many times as necessary to combat the water stresses to which the cultivated plant is subjected during its life, i.e., until it becomes desiccated or wilted. However, the biostimulant according to the invention may also be applied only once by foliar spraying and/or irrigation and/or coating the seed.

The biostimulant and the methods for manufacturing and applying the biostimulant according to the invention, have the advantages of corresponding to many demands of the farmers:

Respect for the environment;

No induced resistance;

Improvement of environmental conditions;

Lack of danger for humans;

Economic interest;

Wide spectrum of use in terms of varieties of plants in cultivation;

Regulatory interest.

Effect of PP1 on the Stimulation of the Growth of Different Plant Species Under Water Stress Study of the effect of biostimulant PP1 on maize under water deficit conditions.

The effects of drought on maize include:

Delayed and irregular collection,

Poor root development,

Decreased growth/foliar development/reproductive organs,

Decreased performance and

Early senescence and grain filling failure.

A field trial was carried out in 2018 (INRA de Mauguio and EURION Consulting).

Figure 24A:
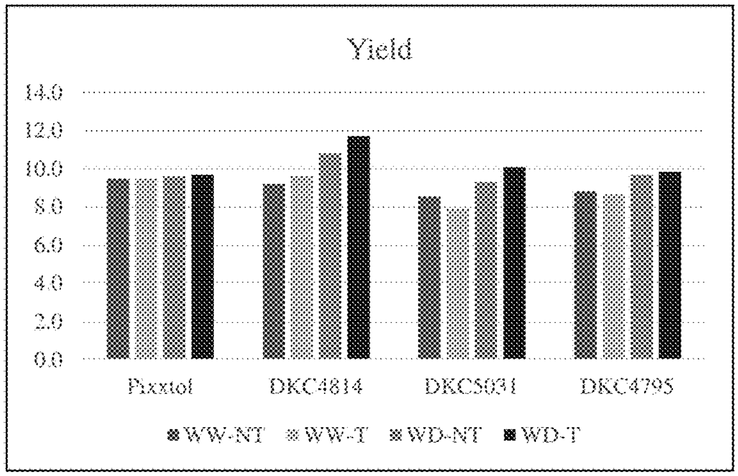
FIGS. 24A to 24C show, in the form of graphs, crop yield, digestibility and lignin of maize under water stress.
Figure 24B:
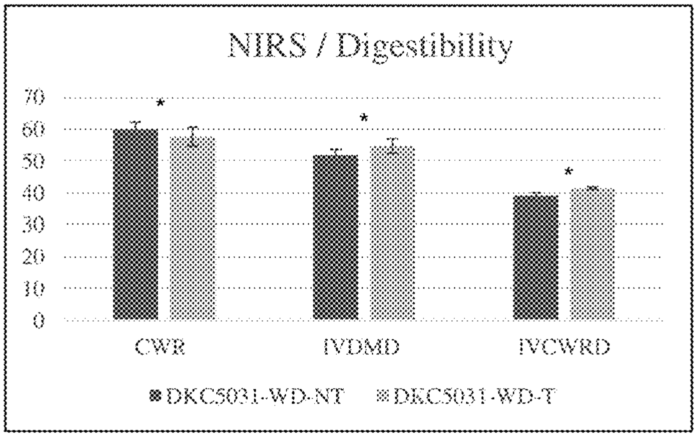
Figure 24C:
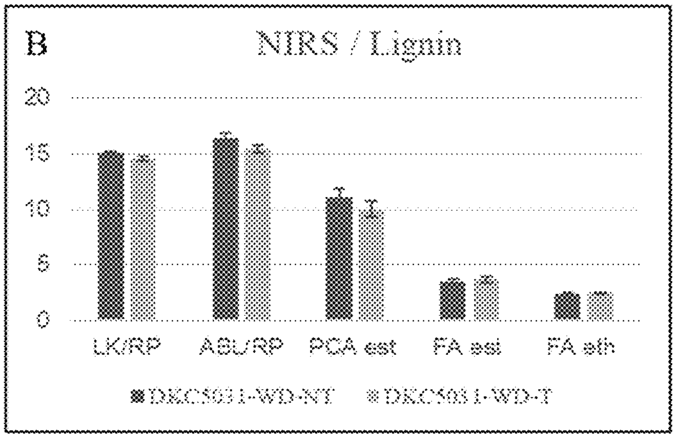

Results: Evaluation of yield. In FIGS. 24A to 24C, "NT" relates to untreated plant, "T" relates to plants treated with PP1, "WW" relates to sufficient irrigation condition and "WD" relates to limiting irrigation condition (water stress).

We can observe on FIG. 24A, that for genotypes DKC4814 and DKC5031, in water deficit condition and treated with PP1, the yield is higher. Thus, PP1 allows stimulation of growth parameters and increased yield under water stress condition.

Evaluation of Parietal Composition.

A field trial was conducted in 2018 (INRA Mauguio and EURION).

Evaluation of the composition of the wall: Whole plant without spikes/Mode of action.

NIRS (Near Infra Red Spectroscopy) predictions of:

Van Soest Channel:

NDF: membrane or parietal carbohydrates

ADL: lignin

LK: lignin Klason

CWR: wall content

Lignin structure by thioacydolysis: BO4/H/G/S/S/G

Ferulic acid content

Pcoumaric acid content

Sugars: Hemicellulose/cellulose/Xylose/Arabinose/Glucose

DMS: digestibility of dry matter

IVCWRD: digestibility of the wall

As shown in FIG. 24B, PP1 allows an increase in the digestibility of dry matter (IVDMD) and the digestibility of the wall (IVCWRD, +2.32 digestibility point—important point for animal feed/better digestibility of fodder).

As shown in FIG. 24C, PP1 allows a decrease in lignin (LK and ABL).

PP1 allows an improvement of the composition of the wall in condition of water deficit/improvement of fodder for animal feed or for the use of by-products from the cultivation of corn (manufacturing of materials).

In conclusion, PP1 stimulates growth in condition of water deficit/important adaptation to the pouring of cereals, stimulates flower and fruit production, allows an increase in yield and an improvement in the composition of the wall.

Effects of the Biostimulant PP1 on the Growth of Pedunculate Oak During a Drought The objective of the following report is to measure the effects of the biostimulant PP1 on the growth of pedunculate oak (*Quercus robur*) in the context of afforestation on agricultural land. To do this, the evolution of the total heights of sessile oak seedlings is measured. The plot being surrounded by forests, but being completely fenced and electrified, it is not expected much abrogatutisation (consumption and deformation of young trees by game) of the plantation.

Human activities, an adjacent alfalfa field and forests, should have no influence on this plot, except possibly during hunting season.

Two pedunculate oak modalities (*Quercus robur*—QUERO) were implemented: Control, (1 block of 40 plants) and treated with PP1 14 days, (1 block of 53 plants). The afforestation is carried out with young seedlings from nursery whose size varies between 15 and 30 cm.

The treatments are carried out by foliar spraying of PP1, 1 g/l, or 190 g/hectare for a density of 1250 pedunculated oaks/hectare.

Equipment used: backpack sprayer: Berthoud, Cosmos 18 pro, capacity 18 liters.

The first treatment took place on Apr. 27, 2021, as soon as the oaks have made their bud break (Time of year when the vegetative and floral buds of the trees develop to reveal their fill (down, young leaves and flowers buried in the buds), then their leaves). Six 14-day spaced sprays were carried out on Apr. 27, May 11, May 27, Jun. 10, Jun. 24 and Jul. 9, 2021.

It should be noted that bud break was later this year 2021, given the cool spring. The ratings were made on 2 dates, 27 Apr. 2021 and 16 Sep. 2021 and concerned the measurement of total heights.

In order to avoid the edge effect, no plants were used (treatment, notation) on the outer edges of the plot.

The notations are made on 15 pedunculated oaks per modality, chosen randomly. In addition to the various measures, the removal of pedunculated oaks by game was monitored.

Statistical analyses were carried out according to the Student test at the threshold of 5%. When the results are significantly different according to the Student test performed at a 95% confidence level, different letters indicate this.

During the test, some damage due to the abrogation of pedunculate oak plants by game was observed. There was no significant particular appetite for game between the modality treated with PP1 and the control modality. This damage is therefore not modality/treatment specific. These observations make it possible to validate all the measurements made on pedunculated oaks.

Results of the measurements carried out on the afforestation of pedunculate oak are given in the following table of the evolution of the total heights, in cm Height Height Dates Witnesses, in cm PP1 14 days, in cm Apr. 27, 2021 27.8(a) 18.7(b)

Sep. 16, 2021 37.5(c) 34.9 c

Increase observed in 5 months+9.7+16.2

As of Sep. 16, 2021, stem oak control plants grew an average of +9.7 cm while those treated with PP1 every 14 days grew an average of +16.2 cm, or 16.2−9.7=6.5 cm more in just 6 months.

Pedunculate oak (*Quercus robur*) plants reacted positively to PP1. Indeed, under non-optimal conditions of culture (natural environment subjected to high pressures and constraints), the application of the biostimulant PP1 every 14 days stimulated their growth, with a total gain of 6.5 cm (23.4%) on average compared to controls.

Treatments allowed the treated lot, which was significantly smaller, to catch up with the growth level of the control lot. It is important to note that this gain is remarkable on this species, despite a very important grassing and an abnormal drought.

Thus, despite a drought, the increase in growth induced by PP1 would facilitate the installation of pedunculate oak (*Quercus robur*) in non-optimal growing conditions such as the natural environment where trees are subjected to strong pressures and constraints in the early years, but also to stimulate root growth resulting in better absorption of nutrients and water by the plant, and this, in a sustainable way.

Effects of the Biostimulant PP1 on the Growth of Sessile Oak During a Drought

The objective of this report is to identify the effects of biostimulant PP1 on the growth of sessile oak in the context of afforestation on agricultural land, surrounded by protective plastic sheath. To do this, it was measured, the evolution of the total height of each tree.

The plot is surrounded by forests, a fallow field and a cultivated field. It is expected a repeal (consumption and deformation of young trees by game) of the plantation. Human activities, should have no influence on this plot, except possibly during hunting season.

Modalities

Two modalities of three blocks of 20 sessile oaks (*Quercus petraea*—QUEPE) were installed:

Control (3×20 plants)

PP1 14 days (3 times 20 plants)

The afforestation is carried out with young seedlings from nursery whose size varies between 15 and 30 cm.

Tests carried out according to EPPO PP 1/152 (4) (European Mediterranean Plant Protection) and the BPE (Good Environmental Practice) guide.

In this plot, red oaks and sessile oaks were planted randomly, in order to mix the species. In this context, the groups of «control» or «treated» plants that concern only sessile oaks do not have regular geometric shapes. In order to avoid the edge effect, no plants were used (treatment, notation) on the outer edges of the plot. In addition to the various measures, the repeal of sessile oaks by game was monitored.

Treatments are carried out by foliar spraying of PP1, 1 g/l, or 190 g/hectare for a density of 1250 sessile oaks/hectare. Equipment used: backpack sprayer: Berthoud, Cosmos 18 pro, capacity 18 liters. The first treatment took place on Mar. 24, 2021, two weeks after planting. Six 14-day spaced sprays were carried out on Mar. 24, Apr. 8, Apr. 22, May 5, May 20 and Jun. 2, 2021.

The ratings were made on two dates, Mar. 24 and Sep. 20, 2021. The notations concern the measurement of the total height of each tree.

Statistical analyses were carried out according to the Student test at the threshold of 5%. When the results are significantly different according to the Student test performed at a 95% confidence level, different letters indicate this.

Abrogation

During the test, little damage due to the abrogation of sessile oak seedlings by game was observed. There was no significant particular appetite for game between the modality treated with PP1 and the control modality. This damage is therefore not modality/treatment specific. These observations validate all measurements made on sessile oaks.

Results of measurements carried out on the reforestation of sessile oak.

Height, in cm Height, in cm

Dates Witnesses PP1 14 days

Mar. 24, 2021 (t=0) 40.3(a) 36.9(a)

Sep. 20, 2021 41.7(a) 49.6(b)

Growth difference observed in 6 months/t=0+1.4+12.7

Growth difference/control 12.7−1.4=11.3 cm

% increase compared to initial size observed in 6 months 3.5% 34.4%

Growth difference/control 34.4−3.5=30.9%

As of Sep. 20, 2021, sessile oak control plants grew an average of 1.4 cm (3.5% from the original size), while those treated with PP1 every 14 days grew an average of 12.7 cm (34.4% from the original size). Under these conditions, plants treated with PP1 grew 11.3 cm more in just 6 months. This difference is significant. Sessile oak (*Quercus petraea*) plants reacted positively to PP1. Indeed, under non-optimal conditions of culture (natural environment subjected to high pressures and constraints), the application of the biostimulant PP1 every 14 days stimulated their growth, with a total gain of 11.3 cm (30.9%) on average compared to the controls. It is important to note that this gain is remarkable for this species, despite an abnormal drought.

The stimulatory effect of PP1 growth was demonstrated, as plants treated with PP1 have an average 30.9% higher growth than controls, and this difference is significant. This is exceptional for this species, because oak has a slow growth.

Despite a drought, the increase in growth induced by PP1 would facilitate the installation of sessile oak seedlings (*Quercus petraea*) in non-optimal growing conditions such as the natural environment where trees are subjected to high pressures and stresses (biotic, abiotic) in the first years, but also to stimulate root growth resulting in better absorption of nutrients and water by the plant, and this, in a sustainable way.

In the following study, the effect of PP1 is shown to be accompanied by a better ability to assimilate phosphate (+42.3%) and nitrate (+51.5%). Hormonal tests compared to PP1 provide initial physiological information on the effects of PP1 biostimulant, remaining more effective than the use of ethylene. PP1 effect has also been tested on water stress and proved promising.

In this study, the Columbia ecotype of *Arabidopsis thaliana* (Col0) was used. The seeds were grown on a 1.5% phyto-agar medium (Roth®) containing 2.6 g $L^{-1}$ of Murashige and Skoog (MS) nutrient mixture (Sigma-Aldrich®) (pH adjusted to 5.6 using KOH). The seeds were sterilized with 70% ethanol mixed with sodium dodecyl sulfate (SDS) 5% (V/V) for 10 min and then transferred to ethanol 90% for 2 min. The plants were grown at 22° C./19° C. under a 16-hour light/8-hour dark photoperiod, in a refrigerated incubator with Peltier elements IPP410-ecoplus (Memmert®) equipped with LED light modules t7 cold 6500 K (~130 μmol $m^{-2} \cdot s^{-1}$ light intensity). All seeds were cold stratified at 4° C. for 2 days prior to germination.

Hormonal treatments and PP1 were added to culture media at different concentrations: 1 g/L dry matter of PP1, 0.5 nM of EBL (Sigma-Aldrich®) (diluted in DMSO (PROLABO®)), 10 nM of auxin (Sigma-Aldrich®), 5 μM of ethephon (Sigma-Aldrich®) (ethylene precursor) and auxin (10 nM)+ethephon (5 μM). The PP1 extract was sterilized with Stericup® filtration units (Millipore®) and hormones with Whatman® UNIFLO® 0.22 μm syringe filters. 40 mL of culture medium supplemented with the different treatments were poured in square Petri dishes (Fisher Scientific®). Each treatment is prepared in triplicata. Arabidopsis thaliana seeds (33/can) were seeded in 12×12 cm square Petri dishes and grown for 3 weeks. Measurements were made after 10 days (root structure) and 21 days (root mass).

Figure 25A:
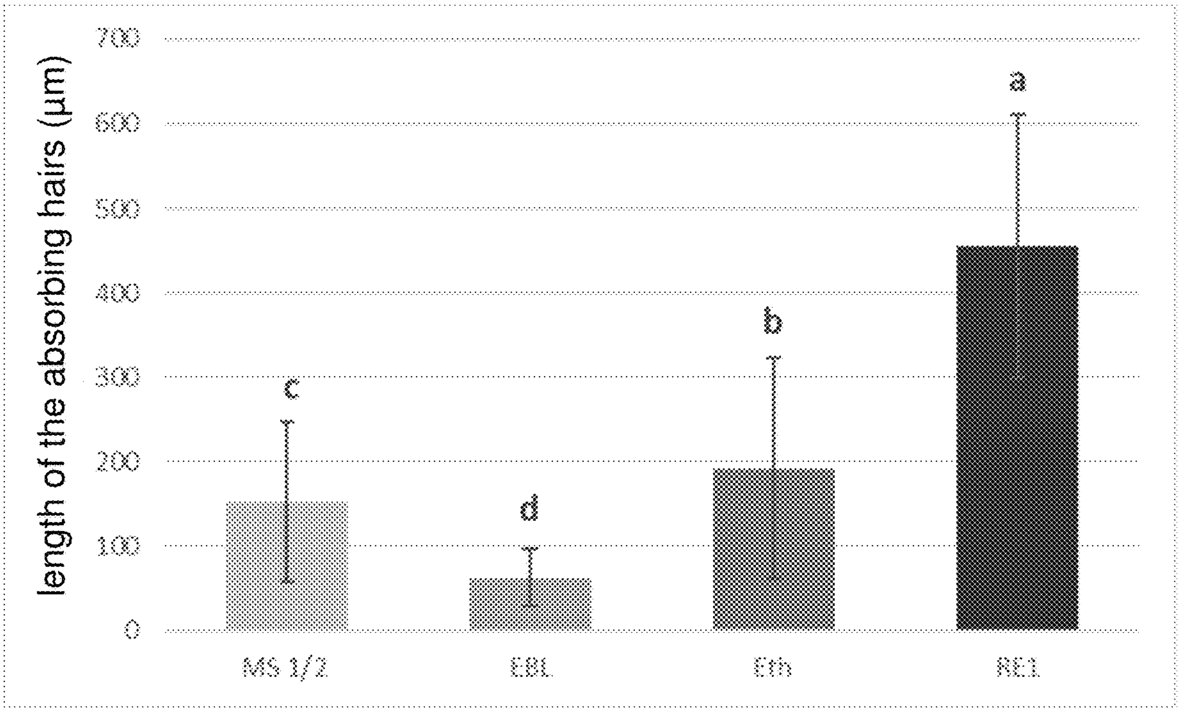
FIGS. 25A and 25B show, in the form of graphs, the length and density of absorbent hair in Arabidopsis thaliana exposed to various treatments.
Figure 25B:
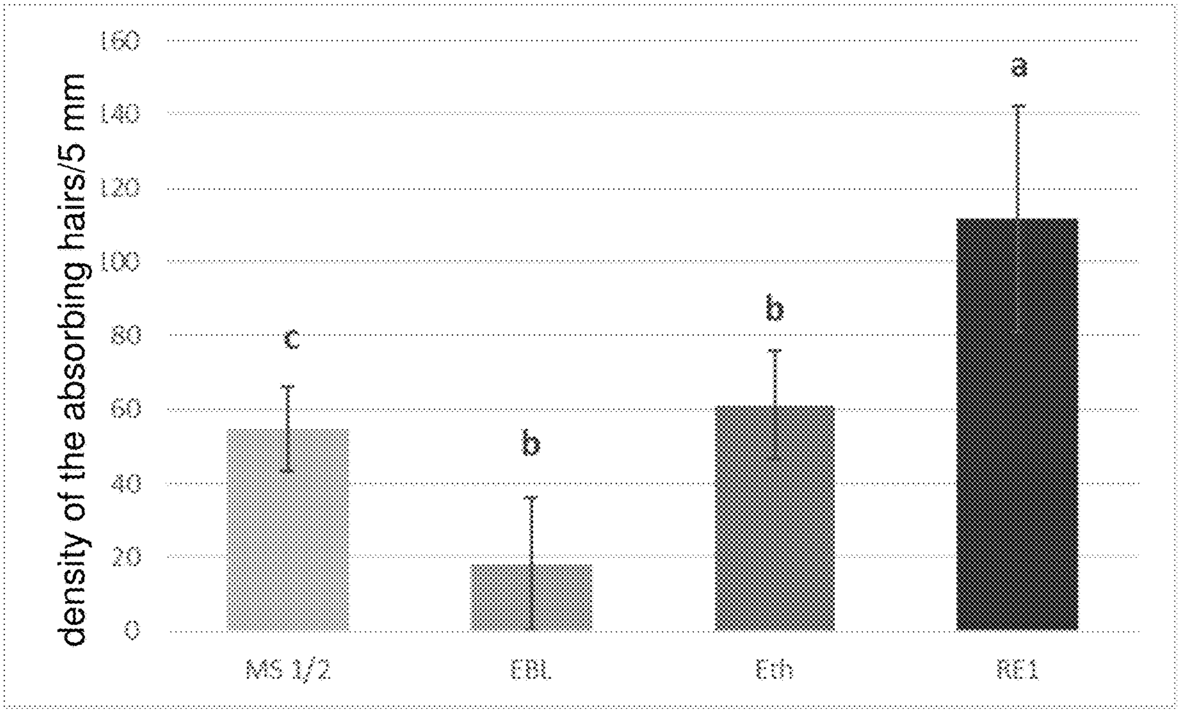
Figure 26:
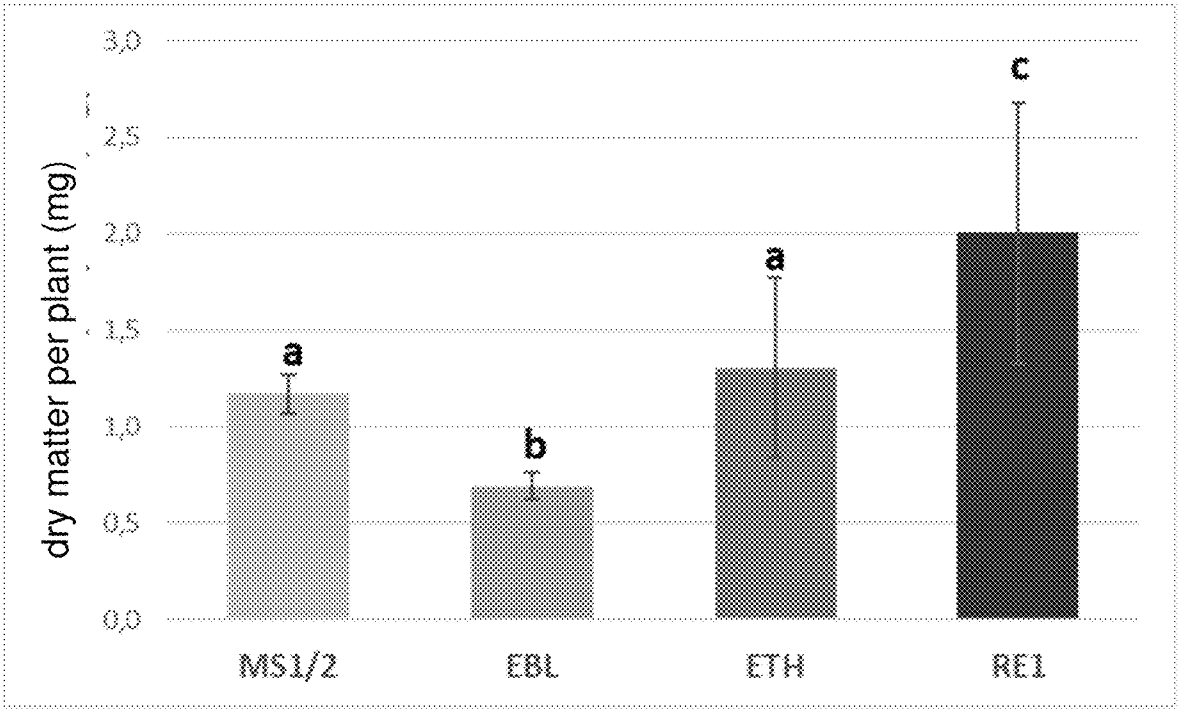
FIG. 26 shows dry matter masses per plant in Arabidopsis thaliana exposed to various treatments.

Comparative effects of EBL and ethylene hormones and PP1 treatment on root development in *Arabidopsis. thaliana* (FIGS. 25A to 26)

FIG. 25A shows lengths of absorbent hair in *Arabidopsis thaliana* exposed to various treatments (EBL, ethylene and PP1). Length of absorbent hairs measured in μm using ImageJ software. Culture of seedlings on capsule media Murashige and Skoog ½ (MS ½). In the order of treatments, two plant hormones are 24 epi-brassinolide (EBL) and ethylene (Eth) compared to the plant extract PP1 (RE1). The modality (MS ½) corresponds to the culture medium without treatment. The letters above the histograms indicate the level of significance (a>d) according to T test and ANOVA.

FIG. 25B shows densities of absorbent hairs in *Arabidopsis thaliana* exposed to various treatments (EBL, ethylene and PP1). The density of absorbent hairs is measured by counting the hairs on 5 mm of root. Culture of seedlings on capsules Murashige and Skoog ½ (MS ½). In order of treatments, two plant hormones are 24 epi-brassinolide (EBL) and ethylene (Eth) compared to the plant extract PP1 (RE1). The modality (MS ½) corresponds to the culture medium without treatment. The letters above the histograms indicate the significance according to T test and ANOVA.

FIG. 26 shows dry matter masses per plant in Arabidopsis thaliana exposed to various treatments (EBL, ethylene and PP1). Culture of seedlings on capsules Murashige and Skoog ½ (MS ½). In order of treatments, two plant hormones are 24 epi-brassinolide (EBL) and ethylene (Eth) compared to the plant extract PP1 (RE1). The modality (MS ½) corresponds to the culture medium without treatment. The dry matter was obtained after freeze-drying of the fresh matter. The letters above the histograms indicate the significance according to T test and ANOVA.

Figure 27A:
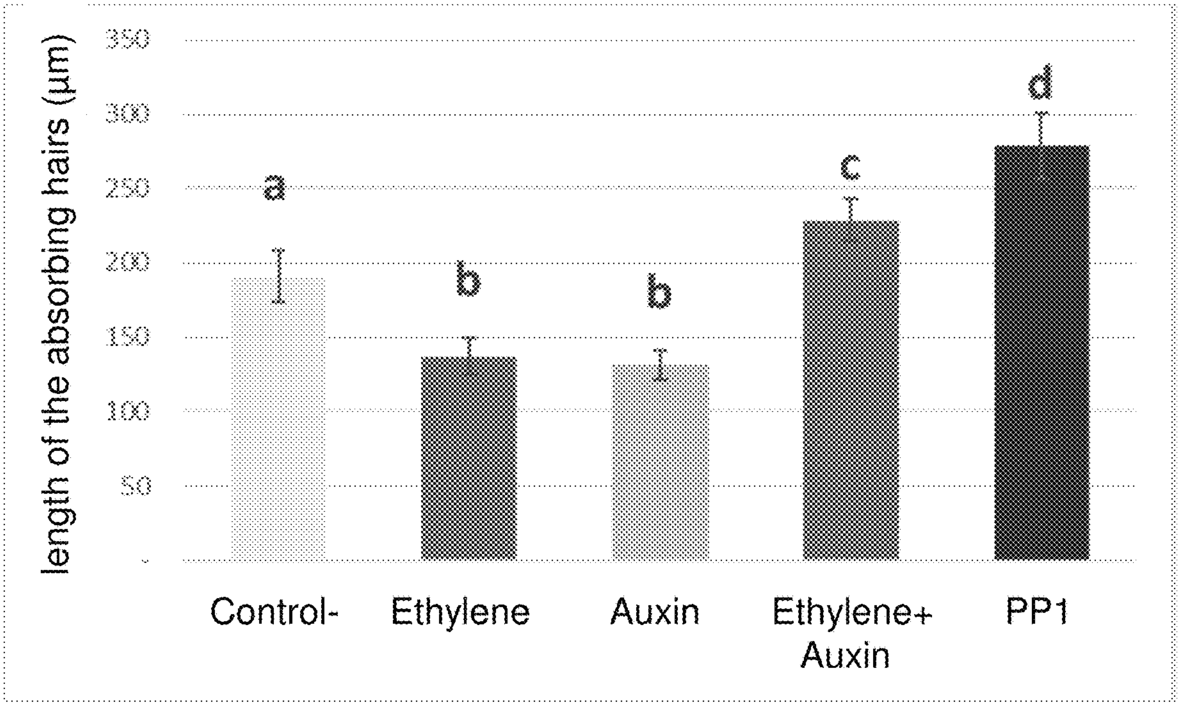
FIGS. 27A and 27B show, in the form of graphs, the length and density of absorbent hair in Arabidopsis thaliana exposed to various treatments.

FIG. 27A shows lengths of absorbent hair in Arabidopsis thaliana exposed to various treatments (ethylene, auxin and PP1). Length of absorbent hair measured in μm using ImageJ software. Culture of seedlings on capsules Murashige and Skoog ½. The control modality—corresponds to the culture medium without treatment. The letters above the histograms indicate the significance according to T-test and ANOVA.

Figure 27B:
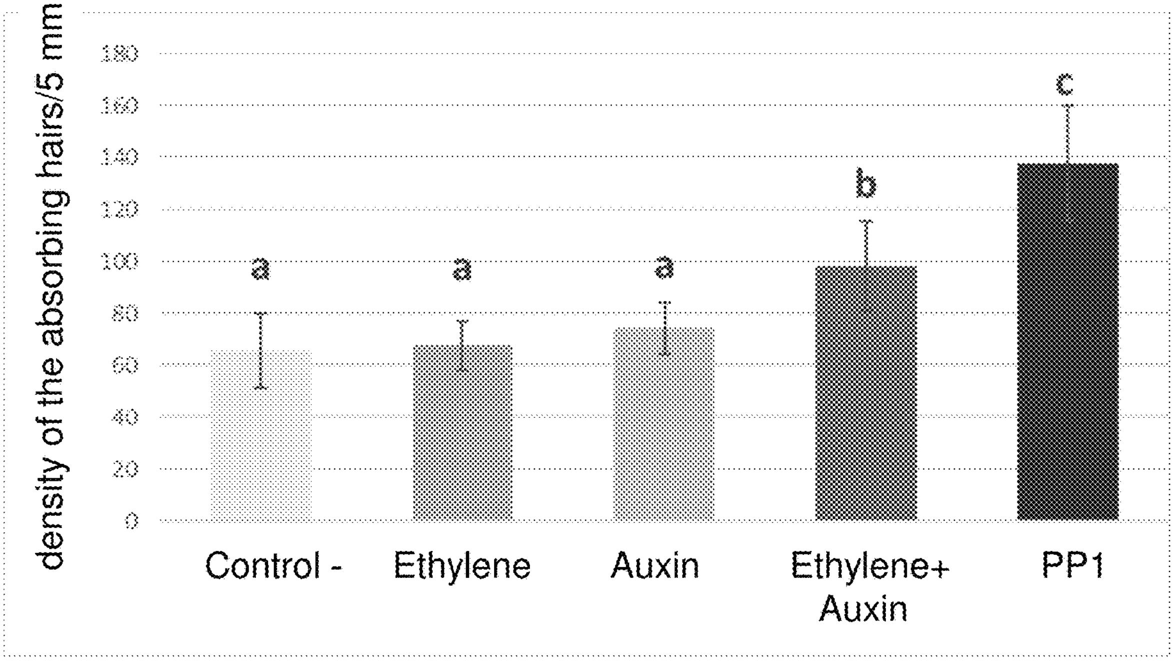

FIG. 27B shows densities of absorbent hairs in *Arabidopsis thaliana* exposed to various treatments (ethylene, auxin and PP1). The density of absorbent hairs is measured by counting the hairs on 5 mm of root. Culture of seedlings on capsules Murashige and Skoog ½. The control modality—corresponds to the culture medium without treatment. The letters above the histograms indicate the significance according to T test and ANOVA.

Effects of PP1 on water stress in Arabidopsis thaliana.

PP1 appears to have an effect on plant development, resulting in an increase in total plant mass. The most remarkable effect of PP1 being the development of absorbent hairs, we hypothesized an increase in ion channels and transmembrane proteins found in root hairs and allowing the transport of nutrients. We therefore wanted to check whether the increase in length and density of these hairs would also allow a better absorption of water under water stress, which would be a major asset in the face of drought or climate change.

After 10 days of growth under water stress conditions (thanks to polyethylene glycol added to the culture medium), various measurements were made to test the effect of PP1 on plants under water stress conditions. It was found that under water stress, fresh PP1 significantly increases the length of the primary root compared to untreated plants.

The length of the main roots of *A. thaliana* grown on an MS ½medium, treated or not with extract PP1 (FIG. 28) was measured after 10 days. Without treatment (control condition), the main roots lengthen on average by 44 mm. In the presence of PP1 (RE1), the root length is 29 mm. In contrast, with fresh PP1 the root length is 34.5 mm. In the presence of PEG 6,000 to 5%, the primary root of the control plants shrinks to 12 mm, plants treated with PP1 RE1 measure 8.5 mm and plants treated with fresh PP1 have a primary root measuring on average 16 mm. The primary root of plants that grew in agar soaked with PEG 6000-10% was not measured, as the measurement was not accurate enough.

Thus, in the presence of PP1 and in optimal condition, it was found that the length of the main root is significantly lower than that of the «untreated» condition, which corroborates the data obtained in previous studies, in which a decrease in the growth of the main root has always been observed. In addition, fresh PP1 was found to significantly increase the length of the primary root under water stress compared to untreated plants. In addition, fresh PP1 significantly increases the length of the primary root, regardless of the condition, compared to non-fresh PP1.

Figure 28:
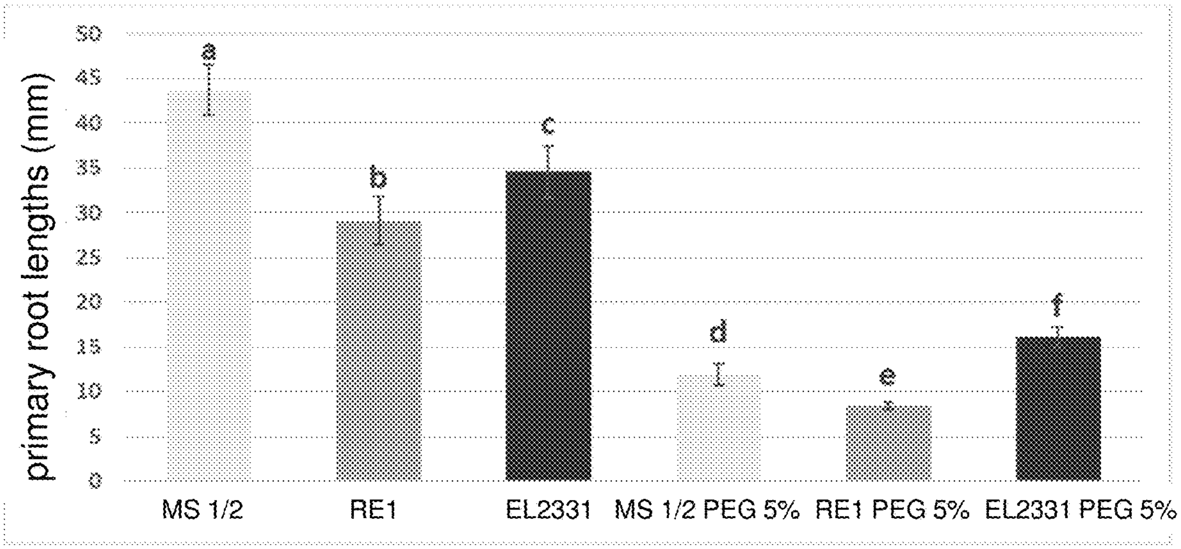
FIG. 28 shows primary root lengths in Arabidopsis thaliana exposed to various treatments.

FIG. 28 shows primary root lengths in Arabidopsis thaliana exposed to various treatments. Primary root length measured in mm using ImageJ software. Culture of seedlings on capsules Murashige and Skoog 1/2. In order of treatments, control-, PP1 (RE1), fresh PP1 (EL2331), control—with PEG 6000 to 5%, PP1 (RE1) with PEG 6000 to 5% and fresh PP1 (EL2331) with PEG 6000 to 5%. The modality (MS ½) corresponds to the culture medium without treatment. The letters above the histograms indicate the significance according to T test.

Under water stress (PEG 6,000 5%), there were 5.77 lateral roots per primary root on average on untreated plants.

There is no significant difference between the same treatments regardless of the water condition. The fresh PP1 allows a significant increase in the number of lateral roots compared to the negative control. Thus, with the fresh PP1, we find results similar to those obtained by the company before.

Again, when analyzing the development of absorbent hair, we found that the results varied considerably according to the treatments, whether in length or density.

Indeed, the absorbent hairs measured about 160 μm (FIG. 29A) in untreated condition (negative control). On the other hand, the length of the absorbing hairs increased by nearly 305% (488 μm) with a treatment based on PP1 (RE1) and 250% (400 μm) with fresh PP1. In conditions of water stress induced by the presence of PEG 6,000 to 5%, untreated plants had absorbent hairs measuring on average 184 μm. The length of the absorbing hairs of plants treated with PP1 increases under water stress, unlike the non-treated absorbing hairs.

Indeed, under water stress, the absorbing hairs of plants treated with fresh PP1 measured 196 μm. Plants treated with fresh PP1 and grown in agar soaked with 10% PEG 6,000 concentrate had absorbent hairs measuring 154 μm. Namely, absorbent hairs of a similar length to those of control plants in optimal condition.

Figure 29A:
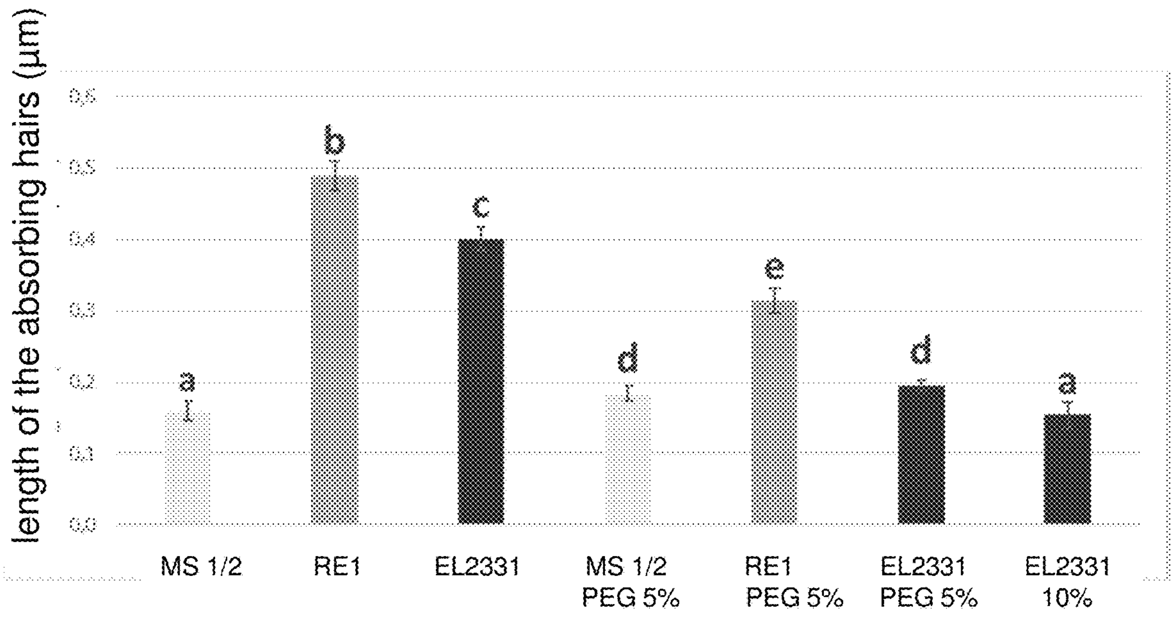
FIGS. 29A and 29B show, in the form of graphs, the length and density of absorbent hair in Arabidopsis thaliana exposed to various treatments.

FIG. 29A shows lengths of absorbent hair in *Arabidopsis thaliana* exposed to various treatments. Length of absorbent hair measured in μm using ImageJ software. Culture of seedlings on capsules Murashige and Skoog ½. In order of treatments, control-, PP1, PP1 fresh, control—with PEG 6000 to 5%, PP1 with PEG 6000 to 5%, PP1 fresh with PEG 6000 to 5% and PP1 fresh with PEG 6000 to 10%. The modality (MS ½) corresponds to the culture medium without treatment. The letters above the histograms indicate the significance according to T test.

Figure 29B:
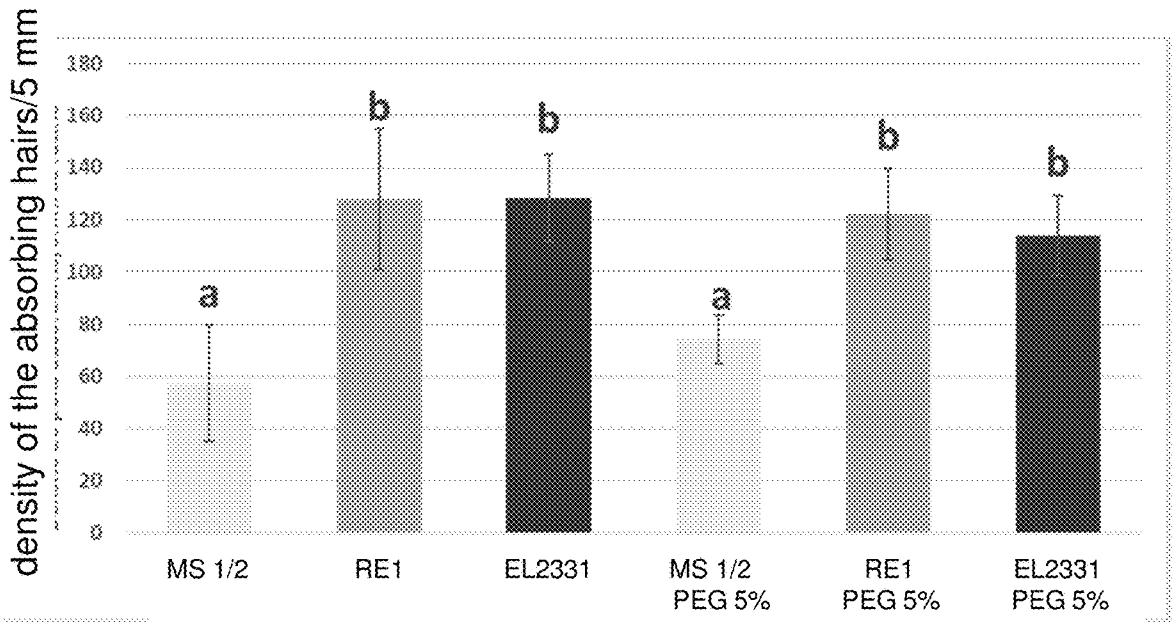

FIG. 29B shows densities of absorbent hairs in *Arabidopsis thaliana* exposed to various. The density of absorbent hairs is measured by counting the hairs on 5 mm of root. Culture of seedlings on capsule medium Murashige and Skoog ½. In order of treatments, control-, PP1, PP1 fresh, control—with PEG 6000 to 5%, PP1 with PEG 6000 to 5% and PP1 fresh with PEG 6000 to 5%. The modality (MS ½) corresponds to the culture medium without treatment. The letters above the histograms indicate the significance according to T test.

Under the control condition, the density expressed in a number of absorbing hairs per root length unit was 58 for 5 mm. This density was 128 or 221% higher, when PP1 was added to the culture medium. Under water stress (PEG 6,000 5%), the density of absorbent hairs for untreated plants was 74. We were able to count 113 hairs for 5 mm of plant roots treated with fresh PP1, 154% more than for untreated plants.

The data obtained show that PP1 strongly and significantly stimulates the length and density of absorbent hairs under water stress condition remain at a significantly higher level when plants are treated with PP1 (AR1), indicating a positive effect of PP1 on water stress tolerance.

Effects on Total Fresh Mass Per Plant (*Arabidopsis thaliana*)

The biostimulant effect of PP1 extract was also evaluated via the evolution of fresh biomass. Thus, in controlled condition, untreated plants had a total fresh matter mass per plant of 7.84 mg.

Finally, we observed a significant increase in the total fresh material mass after the addition of fresh PP1 in the culture medium. Indeed, an average of 21.59 mg per plant was weighed, a rate higher than 177% compared to the control condition. In water stress condition (PEG 6,000 5%), each untreated plant weighed about 7.72 mg or 0.12% less than in control condition. On the other hand, under water stress, the fresh mass of plants treated with fresh PP1 decreased by half (10.71 mg). By further increasing water stress with PEG 6,000 to 10%, the mass of untreated plants was 0.75 mg per plant. On the other hand, on average, a plant treated with fresh PP1 weighed 3.18 mg.

Conclusion: PP1 significantly modifies root architecture by doubling the density and tripling the length of the absorbing hairs along the primary and lateral roots in the arabette. This resulted in an increase in total biomass in *A. thaliana*. Root mass was also increased in *Solanum lycopersicum* after treatment with PP1 extract. Based on the measurement of the absorbing hairs (150 μm for negative controls and 450 μm for *A. thaliana* treated with PP1), the diameter of an absorbing hair (about 6 μm) and the density of absorbing hairs (55 and 110) we can estimate the exchange surface. This is 201 mm2 for untreated plants and 950 mm2 for plants treated with PP1 for 5 mm of root. This means that PP1 has the ability to increase the exchange area by a factor of 4.73 with its growing medium.

Thus, this allowed the plants to amplify their exchange surface between the roots or more particularly the absorbent hairs (a factor of 4.73) and the gelled nutrient media in the arabette (*A. thaliana*) or the substrate used to grow the tomato seedlings (*Solanum lycopersicum*).

This increase in the exchange surface mainly via the increase of trichogenesis after stimulation with PP1 facilitates the absorption of certain mineral elements by the roots in arabets and tomatoes grown on different nutrient substrates. Indeed, the mineral content increased significantly in the presence of PP1 with a 14% increase in sodium content, 43% in phosphate and potassium or 51.5% more nitrates for plants grown in vitro during the first test. By repeating this test, we measured an increase in the absorption of nitrate, phosphate (not significant difference) and potassium but a decrease in sodium levels in the plant.

In contrast, treating *A. thaliana* with PP1 allowed plants to better resist water stress, a very important new feature of the PP1 effect that had not been analyzed before and this deserves our full attention to conduct more in-depth studies that help understand the PP1 effect on plant resistance to water stress.

In the experiment described below, 20-day-old maize plants were treated with different *Rocket* crushed materials. One group of plants was treated under normal conditions, while another group of plants was subjected to water stress throughout their growth. The plants underwent two treatments by spraying with the finished products from the crushed material of three plants from the genus *Rocket* (*Eruca sativa, Diplotaxis erucoides* and *Bunias erucago*) at a rate of ten days. The control plants in both conditions were subjected to the same treatment with water.

The following measurements were taken: Measurements of the mean weight of the aboveground portion of maize plants under the different conditions, subjected to water stress or not, and treated with the finished products from crushed material.

In table 7, for each of the measurements (t=20 days), the results show the means of the values read for 14 individuals per method (n=14), following treatment of the maize plants with the finished products from the crushed material by watering (A) and by spraying (P), compared to the control plants (C). The means are given a different letter when they are statistically different, P<0.05.

TABLE 7

| | C | P | A |
|---|---|---|---|
| NORMAL CONDITIONS | | | |
| Mean weight (g) of the aboveground portion of maize plants after treatment with *Eruca sativa* | 19.3 b | 23.9 a | 24.8 a |
| Mean weight (g) of the aboveground portion of maize plants after treatment with *Diplotaxis erucoides* | 17.2 b | 25.2 a | 24.6 a |
| Mean weight (g) of the aboveground portion of maize plants after treatment with *Bunias erucago* | 18.5 b | 23.5 a | 23.8 a |
| WATER STRESS | | | |
| Mean weight (g) of the aboveground portion of maize plants after treatment with *Eruca sativa* | 3.8 b | 10.6 a | 10.8 a |
| Mean weight (g) of the aboveground portion of maize plants after treatment with *Diplotaxis erucoides* | 2.5 b | 9.5 a | 8.5 a |
| Mean weight (g) of the aboveground portion of maize plants after treatment with *Bunias erucago* | 3.2 b | 10.2 a | 9.8 a |

In the trial conditions referred to as normal (optimum growing conditions), the three crushed materials produced from the three genera of *Rocket* (*Eruca sativa, Diplotaxis erucoides* and *Bunias erucago*) allowed the maize plants to have significantly better foliar development, regardless of the treatment, by watering the soil or by foliar spray. In the water stress conditions, as can be seen, the mean weight of the aboveground portion was very low, given the significant dehydration of the plants (many dry leaves). However, the treated plants presented a significantly better vigor and hydration rate than the control plants, regardless of the *Rocket* genus used.

The application of the product described above showed a positive effect on the tolerance to the lack of water and nutrients. Sprayed on the plants, the two types of application improved the plant's appearance and water content. This property may be the result of an improvement in the root biomass (Marulanda et al. 2009; Anjum et al. 2011), the release of plant hormones such as ABA or CKs into the soil (Zhang & Ervin 2004; Arkhipova et al. 2007; Cohen et al. 2008; Marulanda et al. 2009), or the degradation of ethylene (Arshad et al. 2008).

The list of trials, given as examples, is not exhaustive, and does not in any way represent a limitation to the use of the crushed material that is the subject of the present invention. This crushed material can be effective on many other plant types not described above.

Demonstration of in vitro effectiveness: use of the crushed material that is the subject of the present invention stimulates the growth of root hairs, and root growth. The observed effects on plant growth are greater than the effects observed during treatments carried out with the baseline product described above.

Biostimulants are remarkably interesting tools to produce more and more efficiently in agriculture and horticulture, since they are products of biological origin, and they appear to be biodegradable, non-toxic, non-polluting, and non-hazardous to various organisms. Their actions are consequences of global pools of their constituents, and not of the presence of one single known essential plant nutrient such as auxins or cytokinins, which can yet be present.

The biostimulant called PP1 has shown strong effects on plant growth, especially budbreak and it stimulates plant immune system. These effects have been shown for instance on Arabidopsis thaliana and a quite unexpected effects have also been enlightened, it seems that PP1 has stimulation action on the adventitious rhizogenesis. Adventitious rhizogenesis is characterized by the appearance of roots on a non-root organ such as shoots or leaves. It is a key process in plant vegetative propagation such as plant striking, which is a widely used technique in agronomy and horticulture (roses production, wine production . . . ). This process is induced by the wounding at the cutting site and the isolation of the cutting from soil resources and global signaling network of the plant. Adventitious rhizogenesis is divided into three phases: it starts with the induction phase, when target cells are reprogramming into meristematic cells, forming new root meristems, then comes the initiation phase, which consists in the first cell divisions that lead to the formation of root primordia; at last, the expression phase occurs with the formation of vascular connections and roots emergence.

Adventitious rhizogenesis is hormonally regulated following a complex and not fully characterized yet mechanism. It is established that auxin is responsible of the induction and initiation of adventitious roots, but exogeneous auxins seem to have an inhibition effect on root elongation and secondary root emergence at high concentrations, indeed, it has been shown that auxins are responsible for a decrease in root epidermal and cortical cell length. Regarding to this, auxin, nowadays widely used in horticulture for plant striking, may not be the best component to use in this context.

In this study supervised by Pr. Christian Jay-Allemand (Université de Montpellier—UMR IATE), we decided to determine the effect of PP1 on adventitious rooting (and budbreak) in a plant striking experiment on an easy to root specie: Nerium oleander. We compared PP1 effects with Indole-3-butyric acid (IBA) effects.

Material and Methods.

Harvest of Branches and Cuttings Preparation.

Figure 30:
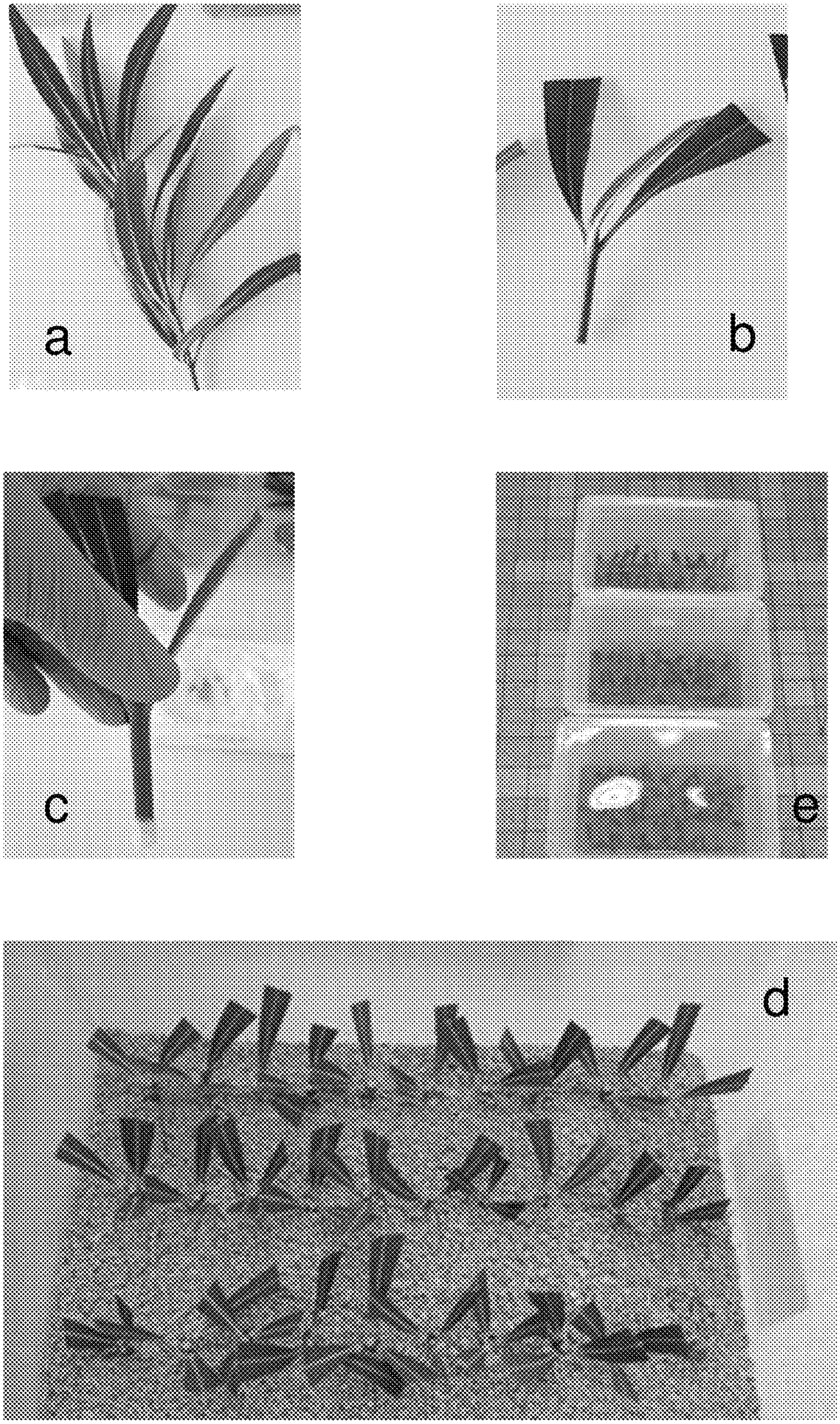
FIG. 30 shows, in the form of photographs, a branch, a cutting, a dried-dip cutting, planted cuttings and cultures boxes.

Nerium oleander branches were harvested from 1-year-old shoots on a single healthy tree located on the Campus Triolet of the Université de Montpellier. Each branch was composed of at least five nodes (FIG. 30, part a) and after a quick rinsing, they were divided in small cuttings composed of only one node by cutting them approximately 1 cm above each node (FIG. 30, part b). Leaves were also cut at half-length to reduce overload in culture boxes (FIG. 30, part b). Cuttings were then put into deionized water during about 20 minutes to be fully hydrated. FIG. 30 illustrates the striking method, part a: Branch harvested from the tree, part b: Cutting, part c: dry dip method, part d: planted cuttings, and part e: culture boxes.

Treatments of Cuttings and Planting

We decided to test two different ways of applying PP1 to our cuttings, we can call them caulinary way and basal way; the former consists in a simple spraying of a water-based PP1 solution, and the latter is a dry dip method, chosen for its ease. It consists coating, in a quick immersion, of the basal part of the cuttings (around one centimeter from the bottom of the cutting) into talc in which the product to test (powder) has been incorporated.

According to the further experiments proceeded on PP1, we decided to use a concentration of 0.1% (w/v) for PP1 solution and a concentration of 1% (w/w) for PP1 mix with talc. For the positive control, we used Indole-3-butyric acid (IBA) in talc. It has been shown that a concentration of 1% (w/w) gives the best rooting results on oak and beech lignified cuttings and that concentration (here in water based IBA solution) between 0.3% (w/v) and 0.4% (w/v) gives the best rooting results on cuttings from 1-year-old shoots from different species; on Nerium odorum L., it seems that a concentration of 0,4% (w/v) gives the better rooting results. Considering these elements, and since IBA penetration into the plant is probably better using a liquid solution that a solid one, we decided to choose a concentration of 0.5% (w/w) of IBA in talc.

Four plastic transparent boxes were cleaned and disinfected (dimensions 47.5 cm×31.5 cm×30.5 cm) and were filled with approximately 7.5 cm high of autoclaved vermiculite, which correspond to a volume of vermiculite of approximately 11.2 L and a planting surface of approximately 1500 $cm^2$. The vermiculite was then homogeneously humidified with 3 L of ultrapure water for each box. 30 cuttings were regularly planted in each box (FIG. 30, part d) after having been quicky soaked into a mix (talc+PP1n, talc+IBA, pure talc) (FIG. 30, part c), then we pulverized 50 μl of a solution in each box (ultrapure water+PP1 or ultrapure water alone). The different treatments of the cuttings are described in table 1. Each box represents a single culture condition; therefore, the 30 cuttings are biological replicates. Cuttings were randomly chosen in order not to bias the experiment. To avoid biases, we soaked the negative control cuttings, and the cuttings prone to receive PP1 by caulinary way, into pure talc; and we pulverized 50 μl of ultrapure water in the two control boxes and in the box with PP1 applied to the cuttings by basal way.

Then, we placed the boxes in a culture room with the following growth conditions: 16 hours of light (artificial) at a temperature of 25° C. and 8 h without light at a temperature of 17° C.

| Treatment code | Number of cuttings | Mix used for quick dip | Solution for pulverization |
|---|---|---|---|
| PP1-F | 30 | Talc + PP1 | 50 ml of water |
| PP1-L | 30 | Talc alone | 50 ml of PP1 at 1 g/L |
| IBA | 30 | Talc + IBA | 50 ml of water |
| $H_2O$ | 30 | Talc alone | 50 ml of water |

Observations and Measurements

Boxes were monitored each day to detect eventual appearance of pathogens and to humidify the cuttings if needed. After 13 days of culture, the number of burst buds and the number of adventitious roots were determined, cuttings were very carefully removed from the vermiculite, a picture was taken and then they were replaced into the vermiculite by digging a hole to avoid root breaking. After 28 days of culture, the number of burst buds, the number of leaves per burst buds and the number of primary adventitious roots were determined as well as the amount of secondary roots. Due to their huge number and their small size, it was not possible to count them, so we attribute a "secondary roots score" to each cutting. The total weight of roots per cutting and burst buds per cutting was determined, by cutting out roots and buds.

Data Analysis

Data were entered into GraphPad Prism, and a bunch of normality test was performed (Anderson-Darling test, D'Agostino & Pearson test, Shapiro-Wilk test, and Kolmogorov-Smirnov test). When all these tests indicate a normal distribution of the values, a T-test was performed to determine significant differences, when at least one of these tests did not indicate a normal distribution of values, a Mann Whitney test was performed to determine significant differences. Confidence interval at 5% is displayed on the graphics, and significant differences are indicated with letters above bars, a single common letter between bars indicate a non-significant difference, when bars do not have any common letter, this indicates a significant difference.

Results 13 Days After Planting

Adventitious roots and burst buds were counted on the 13th day after planting. Both liquid and solid PP1 treatment showed enhancing effects on adventitious root appearance and budbreak with a mean number of burst buds per cutting 7 times higher with PP1-F than with no treatment (FIG. 31A), and a mean number of adventitious roots 6 times higher with PP1-F that with IBA (FIG. 31A).

Figure 31A:
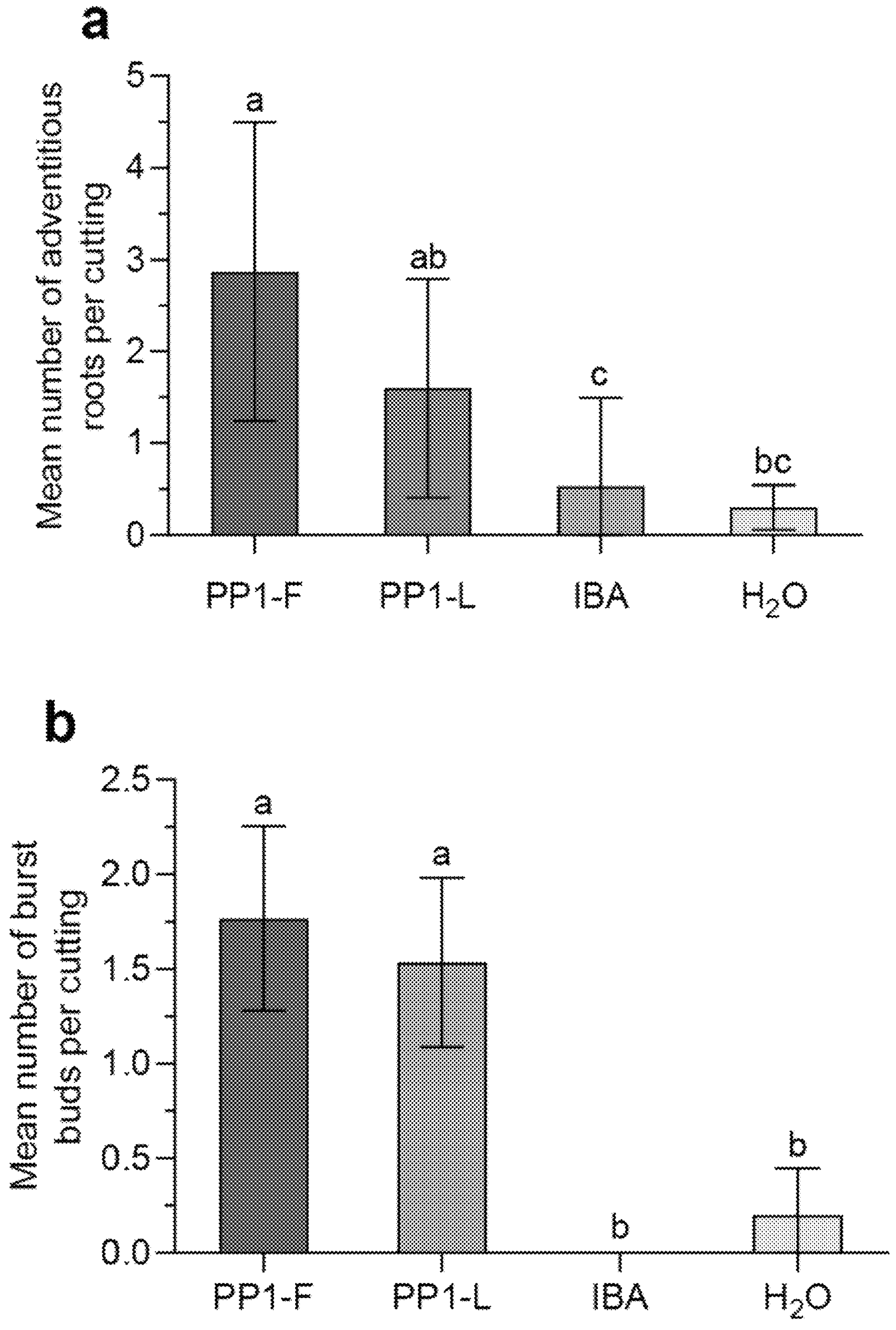
FIG. 31A shows, in the form of graphs, results of counts performed on the $13^{th}$ day of culture of cuttings.
Figure 31B:
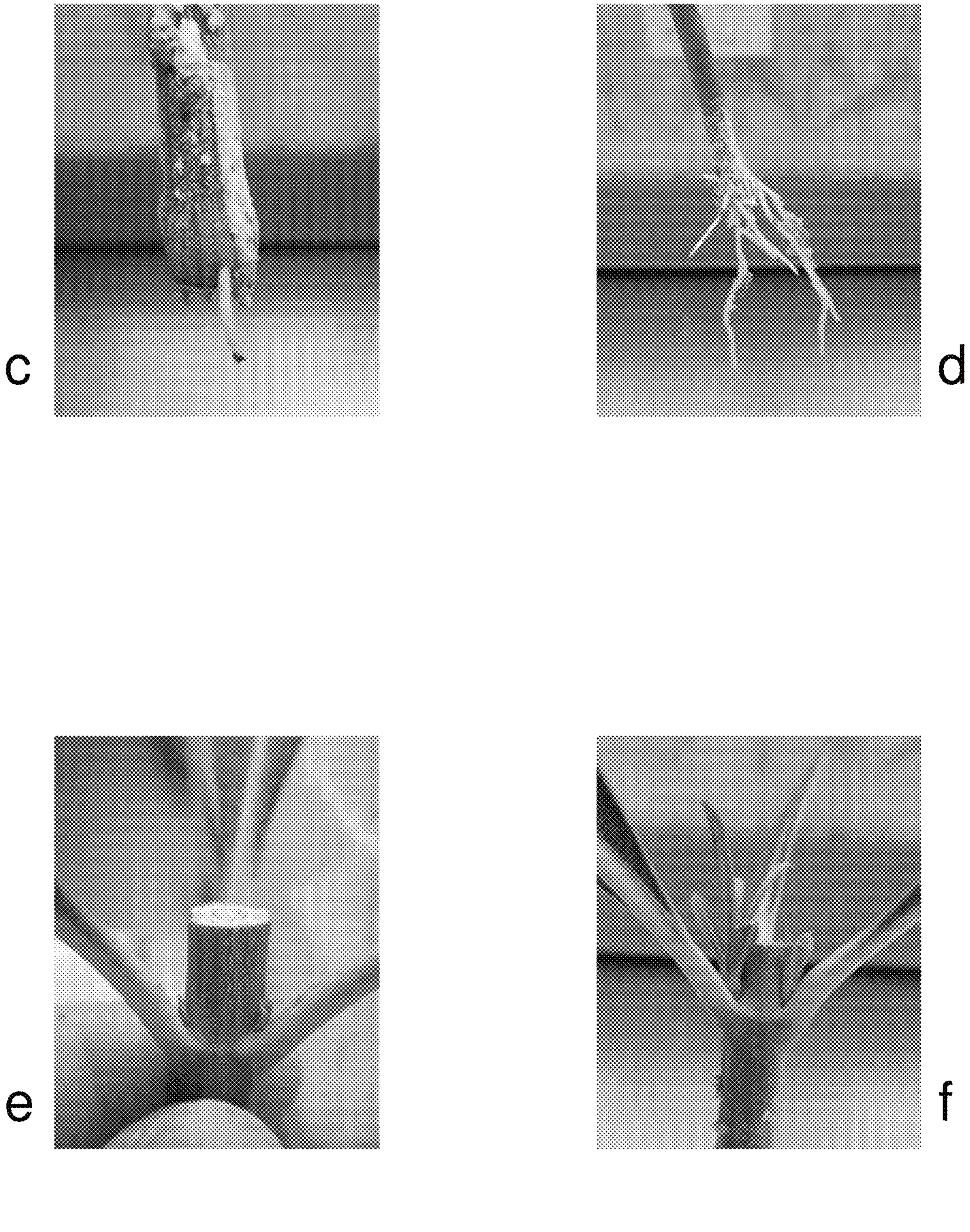
FIG. 31B shows, in the form of photographs, basal parts of cuttings treated with different treatments, on the $13^{th}$ day of culture.

FIG. 31A illustrates the counts performed on the 13th day of culture. Part a: Mean number of visible adventitious roots per cutting on the 13th day of culture; part b: Mean number of burst buds per cutting on the 13th day of culture. Letters indicate significant differences as explained in Material and methods. FIG. 31B shows pictures of the basal part of cuttings treated with water (part c) and PP1-L (part d), and the apical part of cutting treated with water (part e) and PP1-L (part f).

PP1 Effects on Adventitious Rhizogenesis, 28 Days After Planting

On the 28th day after planting, adventitious roots were counted and the mass of adventitious roots per cutting was determined. The two PP1 treatments gave similar results on the mass of adventitious roots per cutting (about 900 mg in average), this mass was significantly higher, approximately 200 mg higher, than the mass of adventitious roots obtained with and IBA treatment and without treatment ($H_2O$) (FIG. 32A).

Figure 32A:
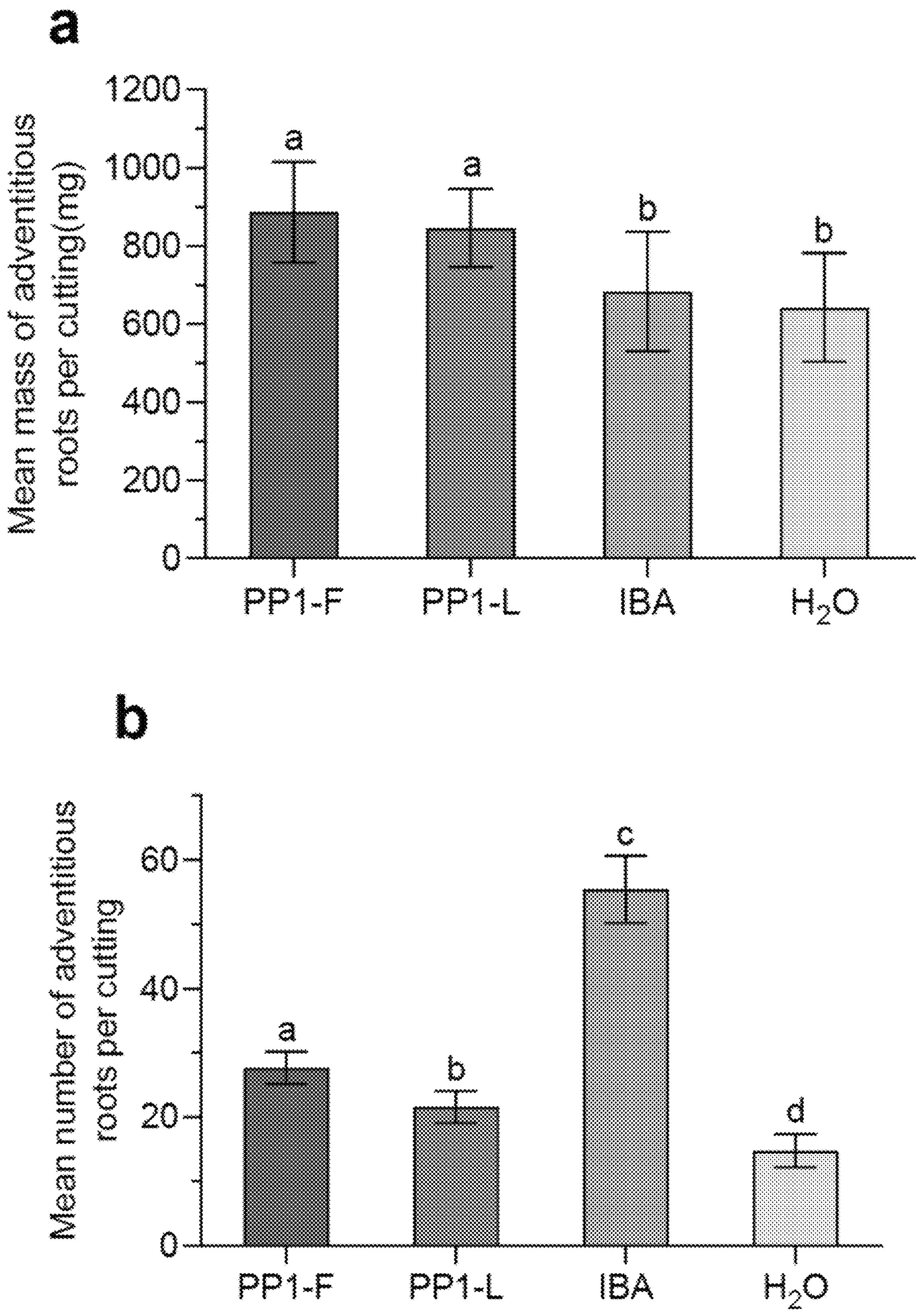
FIG. 32A shows, in the form of graphs, results of counts performed on the $28^{th}$ day of culture of cuttings.
Figure 32B:
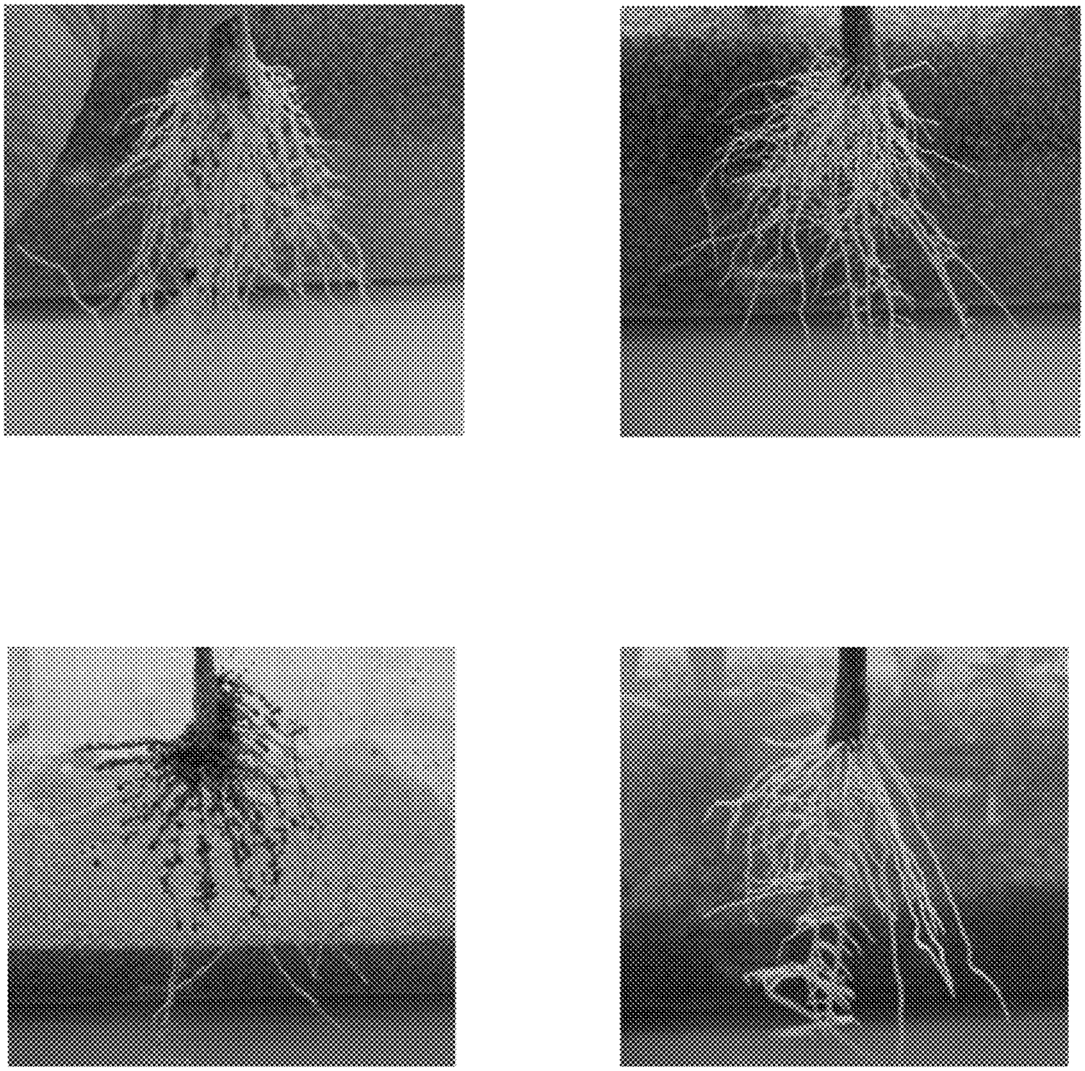
FIG. 32B shows, in the form of photographs, basal parts of cuttings treated with different treatments, on the $28^{th}$ day of culture.

FIG. 32A illustrates the counts and measurements performed on adventitious roots (28th day of culture). Part a: Mean mass of adventitious roots per cutting on the 28th day of culture. Part b, Mean number of adventitious roots per cutting on the 28th day of culture. Letters indicate significant differences as explained in Material and methods. FIG. 32B shows pictures of the basal part of cuttings treated with PP1-F (part c), PP1-L (part d), water (part e) and IBA (part f).

Mean mass of adventitious roots have to be put in relation with the number of adventitious roots, the interesting fact is that, despite a higher mass of roots, PP1 cuttings develop by far less adventitious roots than cutting treated with IBA (FIG. 32A). Indeed, the average mass of a single root is far higher with a PP1 treatment and with no treatment, than with IBA treatment (data not shown). This reflects the fact that IBA leads to an anarchic root development, with lots of small adventitious roots with very few secondary roots; this root appearance occurs along the stems and not only on the basal part of the cuttings, which seems not to be a normal root development, as it is very different from the observations made on the cutting without treatment, than can reasonably be considered as normal development cuttings. Indeed, cuttings without treatment (with only water), show quite long adventitious roots (from 3 to 6 cm in most of the cases) with some secondary roots; the number of these adventitious roots are around 15 per cutting and they come out of the stems on the last centimeter of them (FIG. 32A). Both PP1 solid and liquid treatments showed physiologically similar results to water, PP1 seems to enhance adventitious rooting process without disturbing it as IBA seems to do, indeed, PP1 treated cuttings show more numerous and longer adventitious roots than untreated ones. Furthermore, the amount of secondary roots was higher with PP1 treatments than without treatment and dramatically higher with PP1 treatments than with IBA treatment, PP1 treated cutting show both longer and more numerous secondary roots than untreated ones.

PP1 Effects on Budbreak, 28 Days After Planting

On the 28th day after planting, the number of burst buds per cutting, the number of leaves from bud burst and the mass of buds per cutting was determined.

Figure 33A:
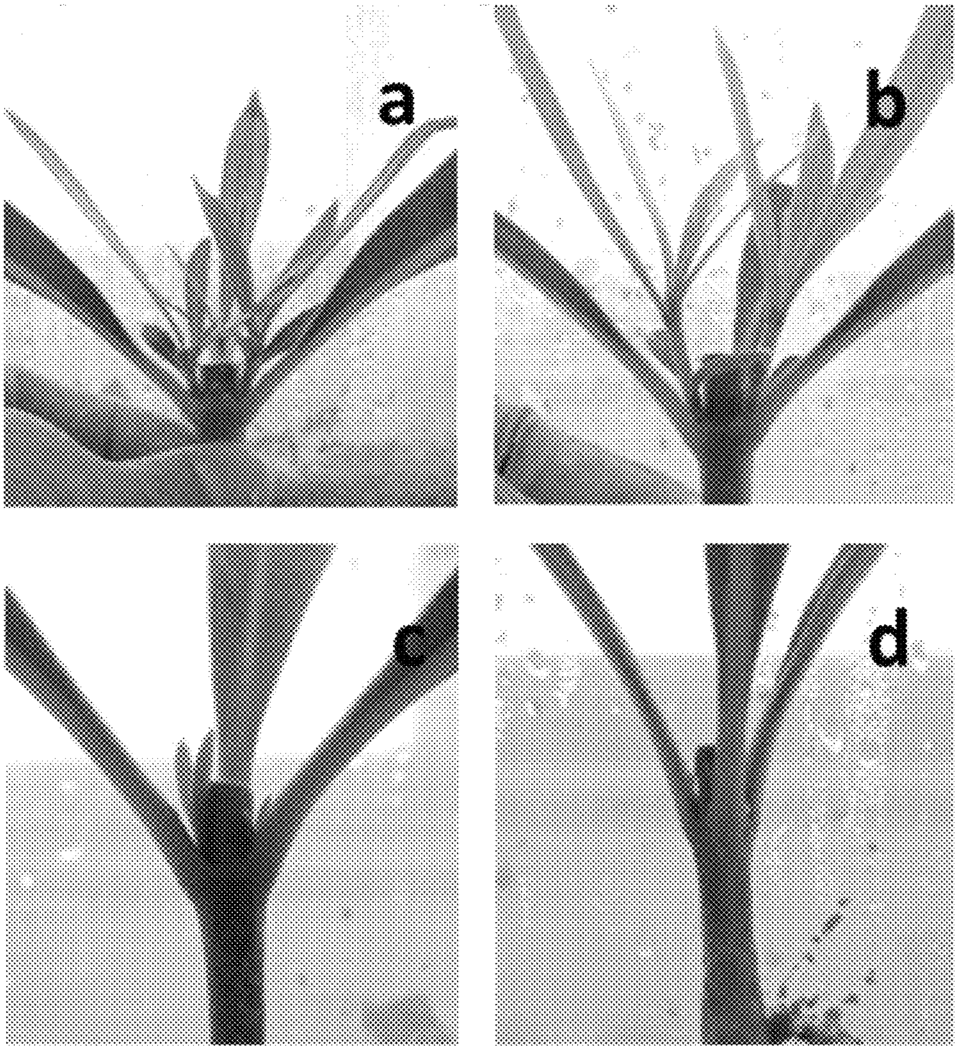
FIG. 33A shows, in the form of photographs, apical parts of cuttings treated with different treatments, on the $28^{th}$ day of culture.
Figure 33B:
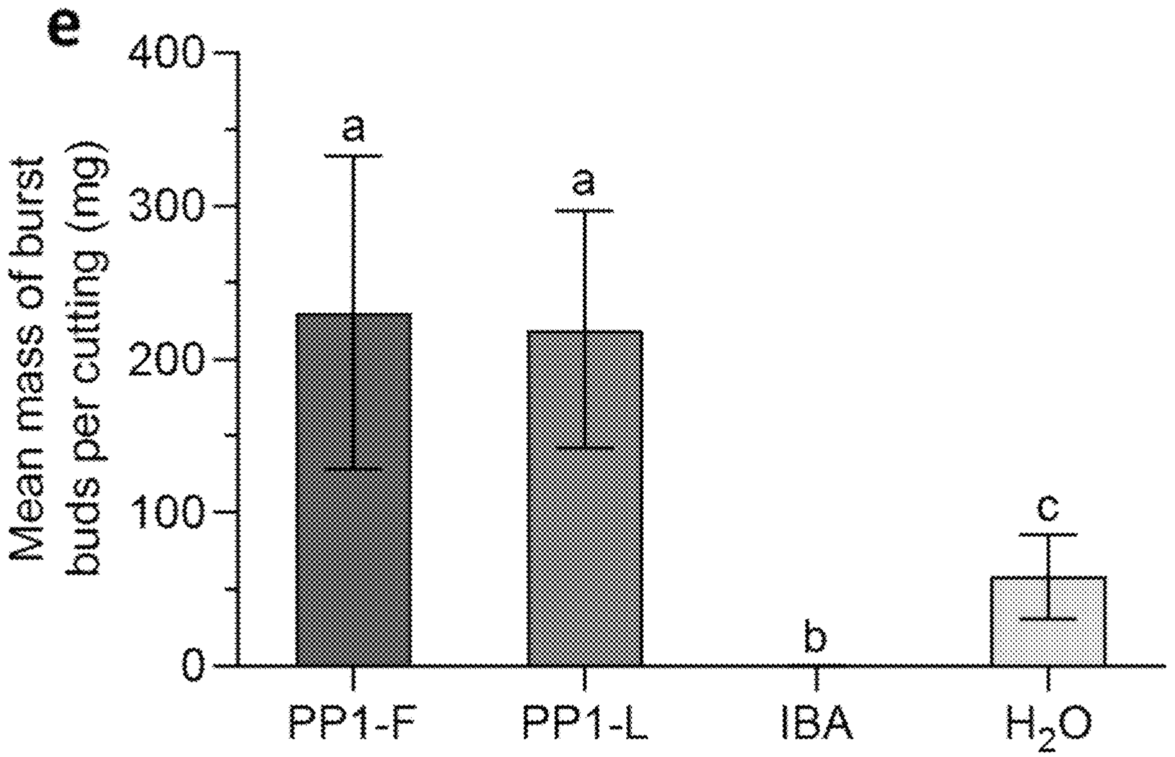
FIGS. 33B and 33C show, in the form of graphs, counts and measurements performed on buds on the $28^{th}$ day of culture.
Figure 33B:
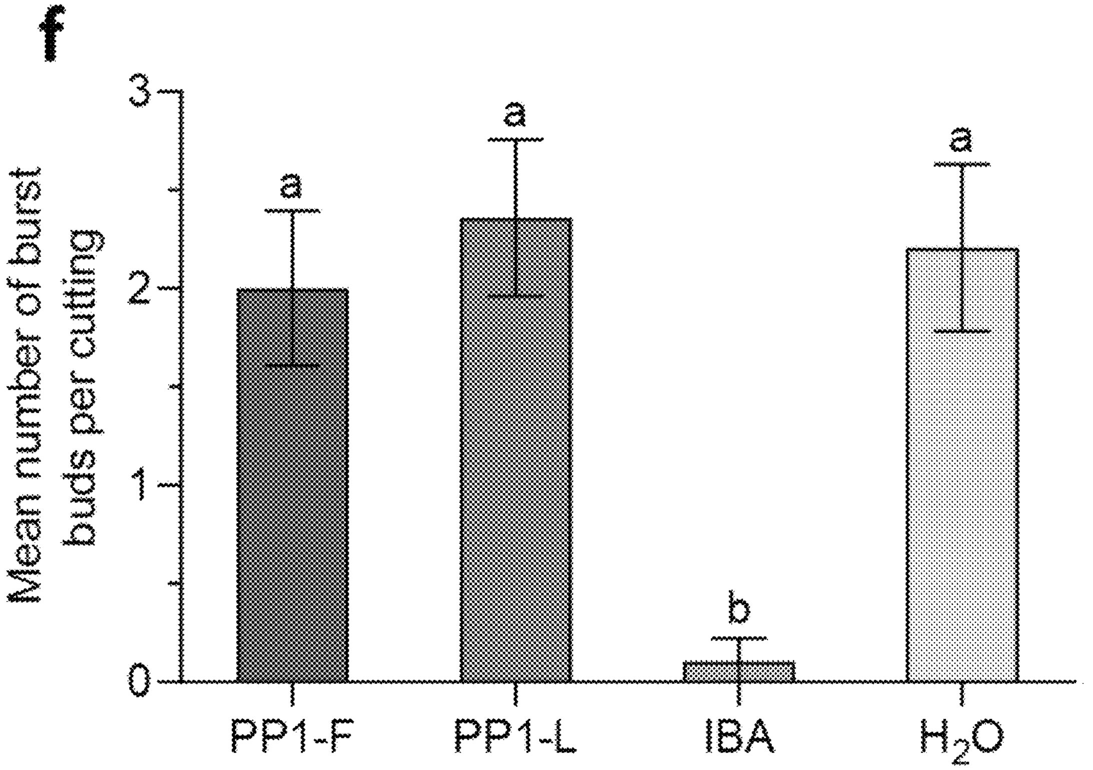
Figure 33C:
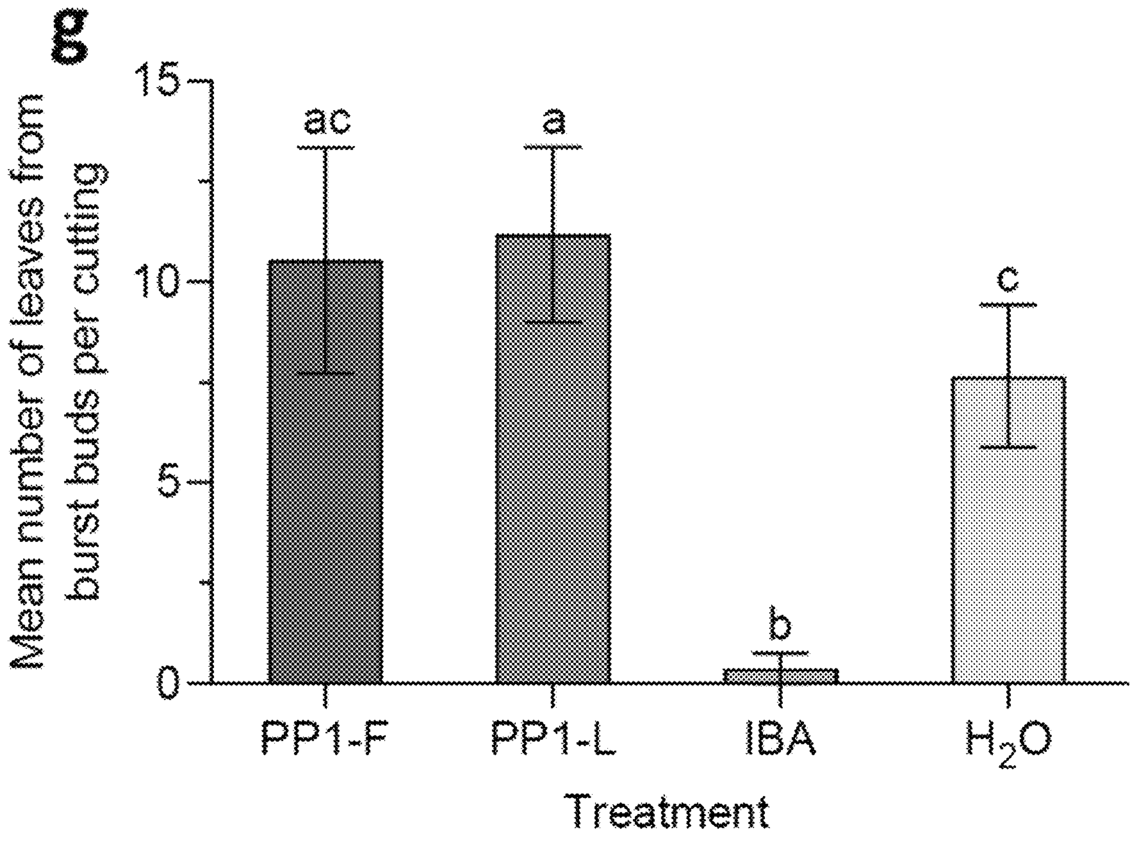

FIG. 33A illustrates the counts and measurements performed on buds (28th day of culture). It shows pictures of the apical part of cuttings treated with PP1-F (part a), PP1-L (part b), water (part c) and IBA (part d). FIGS. 33B and 33C show graphs of mean mass of burst buds per cutting on the 28th day of culture (part e); mean number of burst buds per cutting on the 28th day of culture (part f); and mean number of leaves from burst buds per cutting on the 28th day of culture (part g). Letters indicate significant differences as explained in Material and methods.

As with the adventitious rhizogenesis, both PP1-F and PP1-L treatments gave very similar results, indeed, no significant difference was found between these two treatments in all the parameters studied. However, PP1 has a huge enhancing effect on the budbreak of our cuttings, compared to untreated ones, with a mean mass of buds per cutting around 5 times higher, and a higher mean number of leaves from burst buds per cutting, 3.5 more leaves with PP1 than without in average. PP1 does not seem to have a long-term effect (28 days) on the number of burst buds per cutting. Which seems quite logical since our cutting only had 3 potential buds. PP1 increase the intensity of bud break with the appearance of more numerous, taller, and thus heavier leaves.

IBA seem to have a strong inhibitory effect on budbreak, indeed, only 3 burst buds were found in the whole IBA treated cuttings, it is 19 to 22 time less than with PP1 and 21 time less than without treatment. The same type of observations was made with the average mass of burst buds per cutting (207 times less than without treatment and about 800 times less than with PP1) (FIG. 33B).

Differences Between PP1-F and PP1-L, PP1 Effects Over Time and Correlation Between Budbreak and Adventitious Rhizogenesis We clearly showed that the penetration way of PP1, by the basal part of the cutting, with solid PP1 powder or by a water-based PP1 solution pulverized on leaves, does not seems to have effect neither on adventitious rhizogenesis or budbreak.

Our experiment showed an effect of PP1 over time, indeed, PP1 seems to lead to more precocious processes of budbreak and adventitious rhizogenesis (data not shown). But since we only have 3 measurements over time (0 days, 13 days, 28 days), and since we do not have any data on mass at 13 days, we should do further experiments to confirm this tendency.

An interesting fact that we discovered is that the two studied processes, namely adventitious rhizogenesis and budbreak, seem not to be correlated, indeed, we studied the correlation of them by doing a scatterplot between mass of adventitious roots and mass of burst buds and by calculating the Pearson correlation coefficient between them; with both methods, we were not able to show any correlation between mass of adventitious roots and mass of burst buds, whatever the treatment was.

Discussions

Entry and Transport of PP1's Components and Effect of PP1 on Water Fluxes in the Plants Our experiment shows that PP1 have an enhancing effect on both budbreak and adventitious rhizogenesis. The way of application of PP1 has been shown to have no effects on both processes. Indeed, applying PP1 by pulverizing it on the apical part of the cuttings leads to an adventitious rooting process almost identical to dipping the basal part of the cuttings into a powder PP1 mix; and the same observation was made with budbreak intensity. To understand this quite unexpected result, we first focused our interest on PP1's components penetration into the cutting. Two major different ways are to be considered, let's call them the wounding and the natural way. Wounding way consists into penetration of PP1 by the basal and the apical wound of the cutting, while natural way consists into penetration of PP1 by the leave or stem surface. Although both ways may come into play when we pulverize PP1, normal way is more likely to occur, indeed, the leaf surface is by far higher than the wounding surface, conversely, since the lignification of the outer cells of the stem makes water entry difficult, we can reasonably think that wounding way is more likely to occur in cuttings where dry dip method was used. Since both methods seems to bring different penetration ways into play, but leading to the same result, we concluded that PP1's components are very efficiently transported all along the cutting. These components may also be in sufficient amount not to be totally used by the cells before reaching one of the ends of the cutting.

So as to know whether the biostimulant that is the subject of the present invention may be a product of nature, i.e., a product that could naturally be produced in nature, for example when a *Rocket* plant is crushed, the method described in FIG. 1 was performed again without additional water. This "dry" extraction was carried out according to the following procedure:

- during a "dry" grinding step, the *Rocket* leaves of the same species of *Rocket* plant were ground finely with no additional water (the only water was the water present in the plant cells), for fifteen minutes, in a suitable mixer device to obtain a homogenous crushed material;
- during a filtering step, the crushed material was filtered to separate the leaf matter and obtain a dark green colored liquid without leaf residue, which constitutes a crushed material.

Figure 34:
FIG. 34 shows liquids obtained with and without additional water according to the method shown in FIG. 1.

FIG. 34 shows, on the left, this dark green colored liquid as compared to the green colored liquid obtained according to the process described with regards to FIG. 1, on the right.

Next, this dark colored liquid was used to repeat the same experiment as described with regards to FIGS. 2 and 3 and later the same experiment as described with regards to FIGS. 30 to 33C. That dark colored liquid and the powder obtained from it did not exhibit any growth stimulation effect on tomatoes or on Nerium oleander.

It can be assumed that chemical reactions necessitating dilution in water of different compounds coming from different parts of the plant are necessary to obtain the biostimulant that is the object of the invention. It can also be assumed that hydrophilic molecules from cells participate in these reactions and that they are inhibited in the presence of hydrophobic molecules. Whatever the cause, the biostimulant object of the invention cannot be produced by nature, for example when accidentally crushing a *Rocket* plant. This biostimulant can therefore only be obtained by an industrial or artisanal production process.

Plant Micropropagation Tests

The objective of this experiment is to verify the relevance or the advantage of the use of PP1 in complement or substitution of phytohormones. BAP is the abbreviation of benzyl adenine or 6-benzylaminopurine, phytohormone belonging to the groups of cytokinins that are essential to the development of the plant and that in in vitro culture they are used for the development of the buds of explants. IBA (or AIB) is the abbreviation for indole-3-butyric acid or 1H-indole-3-butanoic acid, is a plant hormone of the auxin family and enters the composition of rooting products.

Methodology

The conventional process of in vitro multiplication based on phytohormones comprises:

Step 1: Delivery of plant material (ready for use) in trays containing culture medium with nutrients (+hormones) at the end of phase 2. The species selected for this study is *Eonymus europaeus* (or European charcoal)

Step 2: Testing to assess the effects of PP1 at different concentrations. Phases 1 and 2 will study the effect of PP1 in the multiplication process from preformed buds forming a bunch of shoots+cal (vs. BAP/sucrose). The duration of this stage is estimated at 4 weeks. Step 3: Effect of PP1 in the development of adventitious roots on leafy shoots of at least 1 cm in length (vs. IBA/Sucrose). The duration of this stage is also estimated at 4 weeks.

Step 4: Effect of PP1 in the acclimatization process of rooted micro-strains. The resulting plants will be adapted to the substrate of the greenhouse. The duration of this stage is also estimated at 4 weeks.

These results could be used as performance indicators in vertical agriculture.

Experimental design: in this experimental phase, it is essential to calculate the effective dose of PP1 at each phase. This trial will consist of 5 different modalities per experimental phase:

1. Explant Multiplication Phase:
   - a. 3 doses of PP1 (g/L of culture medium): 0.25 g/L, 0.5 g/L, 1.0 g/L
   - b. 1 negative control (trays with culture medium and nutrients and without hormones)
   - c. 1 positive control (trays with culture medium and nutrients+BAP/AIB)
2. Explants Rooting Phase:
   - a. 3 doses of PP1 (g/L of culture medium): 0.25 g/L, 0.5 g/L, 1.0 g/L
   - b. 1 negative control (trays/box with culture medium and nutrients and without hormones)
   - c. 1 positive control (trays/box with culture medium and nutrients+AIB/BAP)

A tray/species, with multiplied explants of an age of about 2-3 months, will be used to carry out the first phase of multiplication of the experiment. The test will consist of 3 successive multiplication steps followed by 3 rooting steps.

Phases 1 and 2—Effect of PP1 in the Multiplication Process:
- 12 trays containing only nutrient- and hormone-free culture medium (−BAP−AIB);
- 9 trays will be prepared with each concentration of PP1 (3 concentrations—total 9 trays with PP1;
- 3 trays will be prepared without PP1;
- 3 trays containing only culture medium with nutrients and hormones (+BAP+/−AIB);
- 45 trays in total for this experimental phase;
- Duration of the 4-5 week phase;
- If all three species (charcoal+honeysuckle+viburnum) are tested, 45 trays will be needed in total (15 trays per each multiplication time).

Phase 3—Effect of PP1 in Adventitious Root Development:
- 12 trays containing only culture medium with nutrients and without hormones (−AIB−BAP). Three trays will be prepared containing all 3 concentrations of PP1;
- 9 trays will be prepared with each concentration of PP1 (3 concentrations—total 9 trays with PP1;
- 3 trays will be prepared without PP1;
- 3 trays containing only culture medium with nutrients and hormones (+AIB+/−BAP);
- 45 trays in total for this experimental phase
- Phase duration: 4-6 weeks.

Phase 4—Effect of PP1 in the Acclimatization Process of Rooted Plants:
- 90-100 culture pots to receive rooted plants and containing a substrate adapted to their acclimatization needs.

Results

Table of compositions of different treatments

| Name | ID | BAP (mg/L) | IBA (mg/L) | PP1 (g/L) |
|---|---|---|---|---|
| Control− | DKW0 | 0 | 0 | 0 |
| Control+ | DKW7 | 0.7 | 0.5 | 0 |
| Treatment 1 | DKW7 + PP1 | 0.7 | 0.5 | 0.1 |
| Treatment 2 | DKW3 + PP1 | 0.3 | 0 | 0.1 |
| Treatment 3 | ME230 | 0 | 3 | 0 |
| Treatment 4 | ME230 + PP1 | 0 | 3 | 0.1 |

DKW samples contain the standard culture medium. The “0” means without hormones, the “7” means that all hormones are present and “3” means that only half of the hormones are present. DKW3 medium, low in hormone, is compensated by PP1. ME230 samples contain traditional culture medium and rooting hormones.

Table of results of different treatments

| | DHW0 | DKW7 | DKW7 + PP1 | DKW3 + PP1 | ME230 | ME230 + PP1 |
|---|---|---|---|---|---|---|
| Plants | 45 | 45 | 45 | 45 | 45 | 45 |
| Cals/plant | 43 | 45 | 45 | 45 | 1 | 12 |
| Size of cals | + | ++ | +++ | +++ | + | + |
| Shoots/plant | 2 | 44 | 45 | 45 | 2 | 2 |
| Routs/plant | 0 | 0 | 0 | 0 | 3 | 2 |

Conclusion: Samples that contain PP1 (and only half of the hormones usually provided) behave in the same way as samples that contain only hormones at the “normal” rate. PP1 could thus allow a decrease in the amount of hormones used in the culture medium.

The present invention applies, in particular, to biostimulation of one of the following plants:
- tomato;
- lettuce;
- cucumber;

wheat;
soft wheat;
maize; or
cereal in the broad sense.

LIST OF BIBLIOGRAPHIC REFERENCES

Adesemoye, A. O. and J. W. Kloepper (2009). "Plant-microbes interactions in enhanced fertilizer-use efficiency." *Applied Microbiology and Biotechnology* 85(1): 1-12.

Anjum, S. A., et al. (2011). "Fulvic Acid Application Improves the Maize Performance under Well-watered and Drought Conditions." *Journal of Agronomy and Crop Science* 197(6): 409-417.

Arkhipova, T. N., et al. (2007). "Cytokinin producing bacteria enhance plant growth in drying soil." *Plant and Soil* 292(1-2): 305-315.

Arshad, M., et al. (2008). "Inoculation with *Pseudomonas* spp. Containing ACC-Deaminase Partially Eliminates the Effects of Drought Stress on Growth, Yield, and Ripening of Pea (*Pisum sativum* L.)." *Pedosphere* 18(5): 611-620.

Bashan, Y., et al. (2014). "Advances in plant growth-promoting bacterial inoculant technology: formulations and practical perspectives (1998-2013)." *Plant and Soil* 378(1-2): 1-33.

Berbara, R. L. L. and A. C. Garcia (2014). Humic substances and plant defense metabolism. *Physiological Mechanisms and Adaptation Strategies in Plants Under Changing Environment, Springer:* 297-319.

Berg, G. (2009). "Plant—microbe interactions promoting plant growth and health: perspectives for controlled use of microorganisms in agriculture." *Applied Microbiology and Biotechnology* 84(1): 11-18.

Canellas, L. P., et al. (2011). "Probing the hormonal activity of fractionated molecular humic components in tomato auxin mutants." *Annals of Applied Biology* 159(2): 202-211.

Cohen, A. C., et al. (2008). "*Azospirillum brasilense* Sp 245 produces ABA in chemically-defined culture medium and increases ABA content in *Arabidopsis* plants." *Plant growth regulation* 54(2): 97-103.

Craigie, J. S. (2011). "Seaweed extract stimuli in plant science and agriculture." *Journal of Applied Phycology* 23(3): 371-393.

Ertani, A., et al. (2009). "Biostimulant activity of two protein hydrolyzates in the growth and nitrogen metabolism of maize seedlings." *Journal of plant nutrition and soil science* 172(2): 237-244.

Fan, X., et al. (2006). "Glutamine transport and feedback regulation of nitrate reductase activity in barley roots leads to changes in cytosolic nitrate pools." *Journal of Experimental Botany* 57(6): 1333-1340.

Hayat, R., et al. (2010). "Soil beneficial bacteria and their role in plant growth promotion: a review." *Annals of Microbiology* 60(4): 579-598.

Hong, D. D., et al. (2007). "Seaweeds from Vietnam used for functional food, medicine and biofertilizer." *Journal of Applied Phycology* 19(6): 817-826.

Khan, W., et al. (2013). "Ascophyllum nodosum Extract and Its Organic Fractions Stimulate *Rhizobium* Root Nodulation and Growth of *Medicago sativa* (Alfalfa)." *Communications in Soil Science and Plant Analysis* 44(5): 900-908.

Khan, W., et al. (2009). "Seaweed extracts as biostimulants of plant growth and development." *Journal of Plant Growth Regulation* 28(4): 386-399.

Mancuso, S., et al. (2006). "Marine bioactive substances (IPA extract) improve foliar ion uptake and water stress tolerance in potted *Vitis vinifera* plants." *Advances in Horticultural Science* 20(2): 156-161.

Marulanda, A., et al. (2009). "Stimulation of plant growth and drought tolerance by native microorganisms (AM fungi and bacteria) from dry environments: mechanisms related to bacterial effectiveness." *Journal of Plant Growth Regulation* 28(2): 115-124.

Mattner, S. W., et al. (2013). "The effect of kelp extract on seedling establishment of broccoli on contrasting soil types in southern Victoria, Australia." *Biological Agriculture & Horticulture* 29(4): 258-270.

Milton, R. F. (1952). "Improvements in or relating to horticultural and agricultural fertilizers." *British Patent* 664989.

Milton, R. F. (1964). *Liquid seaweed as a fertilizer*. Proc Int Seaweed Symp.

Norrie, J. and J. P. Keathley (2005). *Benefits of ascophyllum nodosum marine-plant extract applications to Thompson Seedless grape production*. X International Symposium on Plant Bioregulators in Fruit Production 727.

Rayorath, P., et al. (2008). "Rapid bioassays to evaluate the plant growth promoting activity of *Ascophyllum nodosum* (L.) Le Jol. using a model plant, *Arabidopsis thaliana* (L.) Heynh." *Journal of Applied Phycology* 20(4): 423-429.

Rioux, L. E., et al. (2007). "Characterization of polysaccharides extracted from brown seaweeds." *Carbohydrate polymers* 69(3): 530-537.

Sharma, S. H. S., et al. (2012). "Biostimulant activity of brown seaweed species from Strangford Lough: compositional analyses of polysaccharides and bioassay of extracts using mung bean (*Vigno mungo* L.) and pak Choi (*Brassica rapa chinensis* L.)." *Journal of Applied Phycology* 24(5): 1081-1091.

Varanini, Z. and R. Pinton (2000). "Direct versus indirect effects of soil humic substances on plant growth and nutrition." *The Rhizosphere. Biochemistry and organic substances at the soil-plant interface*. (eds. R Pinton: 141-157.

Vessey, J. K. (2003). "Plant growth promoting rhizobacteria as biofertilizers." *Plant and Soil* 255(2): 571-586.

Zhang, X. and E. H. Ervin (2004). "Cytokinin-containing seaweed and humic acid extracts associated with creeping bentgrass leaf cytokinins and drought resistance." *Crop science* 44(5): 1737-1745.

The invention claimed is:

1. A method for stimulating plant resistance to a water stress and for limiting a loss of dry matter linked to the water stress, comprising an application on said plant of an extract obtained by liquid extraction, aqueous extraction or solvent extraction, from at least one part of a *Rocket* plant, thereby reducing effects of the water stress.

2. The method according to claim 1, wherein said *Rocket* plant is from the genus *Eruca, Diplotaxis, Bunias, Erucastrum* or *Cakile.*

3. The method according to claim 2, which comprises a step of grinding in water at least one part of plants from the genus *Eruca, Diplotaxis, Bunias, Erucastrum* or *Cakile* to provide said extract, and a step of filtering solid portions of said extract to obtain a liquid.

4. The method according to claim 2, wherein said *Rocket* plant is from a species selected from *Eruca sativa, Eruca vesicaria, Diplotaxis erucoides, Diplotaxis tenuifolia, Diplotaxis muralis, Bunias erucago, Bunias orientalis, Erucastrum nasturtiifolium*, and *Erucastrum incanum.*

5. The method according to claim 4, wherein said *Rocket* plant is from a species selected from *Eruca sativa* and *Diplotaxis tenuifolia.*

6. The method according to claim 5, which comprises a step of grinding in water at least one part of plants from *Eruca sativa* and *Diplotaxis tenuifolia* to provide said extract, and a step of filtering solid portions of said extract to obtain a liquid.

7. The method according to claim 1, wherein during the application of said extract on said plant, said plant is a tomato, a lettuce, a cucumber, wheat, soft wheat, maize, a vegetable, an ornamental plant, a shrub or a cereal.

8. The method according to claim 1, wherein application of said extract on said plant is achieved by foliar spray, watering soil, drop-by-drop irrigation, use in hydroponics, or seed coating.

9. The method according to claim 1, wherein during the application of said extract on said plant, said plant is a tree.

10. The method according to claim 1, wherein the extract is obtained from leaves of plants from the genus *Eruca, Diplotaxis, Bunias, Erucastrum* or *Cakile*.

11. The method according to claim 1, wherein the application is performed on roots of said stimulated plant.

12. The method according to claim 1, wherein the application is performed by applying a liquid comprising between 0.01-12 g of said extract per liter of said liquid.

13. A method for stimulating plant resistance to a water stress and for limiting a loss of dry matter linked to the water stress, comprising an application on said plant, of an extract obtained by aqueous extraction, from at least one part of a plant selected from *Eruca sativa* and *Diplotaxis tenuifolia*, thereby reducing effects of the water stress, wherein said application on said plant is achieved by watering soil, drop-by-drop irrigation, use in hydroponics, or seed coating, said method comprising a step of grinding in water at least one part of plants from *Eruca sativa* and *Diplotaxis tenuifolia* to provide said extract, and a step of filtering solid portions of said extract to obtain a liquid, wherein said plant on which said extract is applied is a tomato, a lettuce, a cucumber, wheat, soft wheat, a vegetable, an ornamental plant, a tree, a shrub or a cereal except maize.

14. The method of claim 1, wherein the application is performed before the water stress occurs.

15. The method according to claim 1, wherein the application is performed after the water stress occurs.

* * * * *